US012210478B2

(12) United States Patent
Matosevic et al.

(10) Patent No.: US 12,210,478 B2
(45) Date of Patent: Jan. 28, 2025

(54) OVERLAY LAYER HARDWARE UNIT FOR NETWORK OF PROCESSOR CORES

(71) Applicant: Tenstorrent Inc., Toronto (CA)

(72) Inventors: Ivan Matosevic, Toronto (CA); Davor Capalija, Toronto (CA); Jasmina Vasiljevic, Toronto (CA); Utku Aydonat, Toronto (CA); S. Alexander Chin, Toronto (CA); Djordje Maksimovic, Toronto (CA); Ljubisa Bajic, Toronto (CA)

(73) Assignee: Tenstorrent Inc., Toronto (CA)

( * ) Notice: Subject to any disclaimer, the term of this patent is extended or adjusted under 35 U.S.C. 154(b) by 0 days.

(21) Appl. No.: 18/196,418

(22) Filed: May 11, 2023

(65) Prior Publication Data
US 2023/0281155 A1    Sep. 7, 2023

Related U.S. Application Data

(63) Continuation of application No. 17/035,046, filed on Sep. 28, 2020, now Pat. No. 11,734,224.

(51) Int. Cl.
*G06F 15/78* (2006.01)
*G06F 15/173* (2006.01)
(Continued)

(52) U.S. Cl.
CPC ........ *G06F 15/7871* (2013.01); *G06F 15/173* (2013.01); *G06F 15/7825* (2013.01); *G06F 15/825* (2013.01); *G06F 9/3004* (2013.01)

(58) Field of Classification Search
CPC ............. G06F 15/7807; G06F 15/7825; G06F 15/7867; G06F 15/7871; G06F 15/825
See application file for complete search history.

(56) References Cited

U.S. PATENT DOCUMENTS 7,882,277 B2 * 2/2011 Todaka ............... G06F 11/1443
710/24
10,380,063 B2    8/2019 Tang et al.
(Continued)

FOREIGN PATENT DOCUMENTS

CN      101778049 A    7/2010
WO   2020061888 A1    4/2020

OTHER PUBLICATIONS

Final Office Action from U.S. Appl. No. 17/035,046 dated Jun. 28, 2022, 14 pages.
(Continued)

*Primary Examiner* — Jacob Petranek
(74) *Attorney, Agent, or Firm* — Daylight Law, P.C.

(57) ABSTRACT

Methods and systems for executing an application data flow graph on a set of computational nodes are disclosed. The computational nodes can each include a programmable controller from a set of programmable controllers, a memory from a set of memories, a network interface unit from a set of network interface units, and an endpoint from a set of endpoints. A disclosed method comprises configuring the programmable controllers with instructions. The method also comprises independently and asynchronously executing the instructions using the set of programmable controllers in response to a set of events exchanged between the programmable controllers themselves, between the programmable controllers and the network interface units, and between the programmable controllers and the set of endpoints. The method also comprises transitioning data in the set of memories on the computational nodes in accordance with the application data flow graph and in response to the execution of the instructions.

34 Claims, 9 Drawing Sheets

(51) Int. Cl.
 *G06F 15/82* (2006.01)
 *G06F 9/30* (2018.01)

(56) References Cited

U.S. PATENT DOCUMENTS

| | | |
|---|---|---|
| 10,616,045 B2 | 4/2020 | Dubey et al. |
| 10,628,622 B1 | 4/2020 | Sivaraman et al. |
| 11,227,086 B2 | 1/2022 | Boesch et al. |
| 2008/0005402 A1 | 1/2008 | Kim et al. |
| 2008/0181115 A1 | 7/2008 | Soulie et al. |
| 2009/0260013 A1* | 10/2009 | Heil ................ G06F 9/3851 |
| | | 718/103 |
| 2014/0355449 A1 | 12/2014 | Tokuoka |
| 2017/0185449 A1* | 6/2017 | Zhang .................. G06F 9/505 |
| 2019/0018815 A1 | 1/2019 | Fleming et al. |
| 2019/0303153 A1* | 10/2019 | Halpern ............. G06F 15/825 |
| 2020/0174849 A1 | 6/2020 | Yang et al. |
| 2023/0251994 A1* | 8/2023 | Shah ................. G06F 9/44505 |
| | | 712/15 |

OTHER PUBLICATIONS

Non-Final Office Action dated Feb. 4, 2022 from U.S. Appl. No. 17/035,046, 21 pages.
Notice of allowance from U.S. Appl. No. 17/035,046 dated Mar. 21, 2023, 9 pages.
Schor et al., "Scenario-Based Design Flow for Mapping Streaming Applications onto On-Chip Many-Core Systems", CASES'12, Oct. 7-12, 2012, Tampere, Finland, pp. 71-80.

\* cited by examiner

400

OVERLAY LAYER HARDWARE UNIT FOR NETWORK OF PROCESSOR CORES

CROSS REFERENCE TO RELATED APPLICATIONS

This application is a continuation of U.S. patent application Ser. No. 17/035,046, filed on Sep. 28, 2020, which is incorporated by reference herein in its entirety for all purposes.

BACKGROUND

Processing cores can cooperatively execute complex computations by executing component computations of that complex computation in distributed fashion across the processing cores. To do so, the processing cores need to share data required for the execution of those component computations as well as receive instructions regarding which component computations they have been assigned. The technology associated with how the complex computation is broken down into component computations and assigned to the various processing cores is associated with the field of parallel computing.

Processing cores can be connected via a network to facilitate the exchanges of data associated with parallel computing. Each processing core can be connected to the network via a dedicated router. When the processing cores are located on a single chip, the network can be referred to as a network-on-chip (NoC). Data can be transmitted amongst the cores using unicast, multicast, or broadcast transmissions. The transmissions can be single-hop or multi-hop depending upon how the cores are connected and the physical location of the source and destination cores within the network. For example, adjacent cores may be able to communicate using a single-hop transmission while distal cores might need to communicate via multi-hop transmissions as data is passed in series between adjacent routers and forwarded from each intermediate router on to the final destination router.

FIG. 1 illustrates a portion of a NOC 100 in which four processing cores 101, 102, 103 and 104 are linked by a network. The network includes a set of buses and a set of routers that facilitate communication among the processing cores. There is a dedicated router associated with each processing core, such as routers 110, 111, 112 and 113. The routers 110, 111, 112 and 113 communicate with their associated processing core 101, 102, 103 and 104 using a network interface unit (NIU). The set of buses include wires connecting the routers to each other and the routers to their NIUs. The NIU is instantiated in hardware on the processing core. The processing cores execute the component computations they have been assigned using a memory and a processing pipeline. The inputs and outputs of the component computations are routed using the routers under the control of the NIUs. The NIUs are low-level components and can execute data transmissions using corresponding low-level memory copy primitives in which a local segment of memory on a processing core is copied to a remote segment of memory on another processing core. In the basic case of a single-hop unicast data transmission, the memory copy operation involves copying a buffer of a limited fixed size from memory on a source core and writing it to a buffer in a memory on the destination core via the buses. To transmit larger amounts of data, the system can issue multiple memory copy operations. A central processing unit (CPU) in the processing cores is involved in both the computation operations and the data flow management.

FIG. 1 also illustrates a layer diagram 150 of the same NoC 100. In layer diagram 150, and all other layer diagrams in this disclosure, blocks with sharp edges indicate hardware while blocks with rounded edges indicate software instantiated by the hardware on which the block is stacked. The layer diagram shows computation layer 151 which is instantiated by instructions executed by the processing pipelines and stored in the memories of each of the processing cores, and the NoC layer 152 which is instantiated by instructions executed by the NIUs and routers on the various cores that implement the low-level primitives associated with transmissions of data among the cores. The concept of executing instructions is used herein to describe the operation of a device that conducts any logic or data movement operations, even if the "instructions" are specified entirely in hardware (e.g., an AND gate executes an "AND" instruction). The term, when used with reference to a device, is not meant to impute the ability to be programmable to that device. Indeed, those of ordinary skill in the art will recognize that NIUs are not highly configurable or programmable. The set of instructions on a processing core that are required to execute a memory copy operation of a buffer in the single-hop unicast data transmission example mentioned above are fairly numerous and involve the following: identifying the remote segment of memory to which the data will be copied, assuring that the remote segment of memory has enough space for the copy operation, keeping track of and reserving a local segment of memory, breaking up the buffer into smaller pieces that can be handled by the NIU, and providing the NIU with the address for each piece of the data to be transmitted, and also tracking the status of the memory copy operation of each of the pieces. Furthermore, beyond a predetermined buffer size, the required instructions can also involve breaking up the buffer into multiple buffers and conducting multiple buffer memory copy operations for each of those buffers.

The NoC layer 152 abstracts away only the transfer of a fixed piece of data (via the low-level memory copy primitive) from the purview of the computation layer 151. As described above, computation layer 151 is still involved with software instructions that initiate and track the status of the memory copy operation. In addition, computation layer 151 also participates in multicore data flow management and control at a level above the simple memory copy operations. In practice, the workload of the computation layer in this regard includes the management of the data structures into which the data will be written, keeping track of the location of those data structures, polling source cores to see if data is ready for inbound transfers, and transmitting signals to destination cores to alert them that data is ready for outbound transfers. An example data structure for buffer storage on a processing core may be a first in first out (FIFO). Thus, the computation layer needs to manage a write pointer for a FIFO buffer in memory and will need to deal with situations such as when the FIFO buffer becomes full or in which multiple cores are requesting to write to the same destination FIFO buffer at the same time, and then arbitrate among these write requests.

SUMMARY

Methods and systems related to the field of data management for networks of computational nodes are disclosed herein. An example of a network of computational nodes is a network on a chip (NoC) and an example of the computational nodes are processing cores in a multicore processor. The computational nodes can be cooperating in the execution of a complex computation for which an application data flow graph is required to be executed in order for the data involved with the complex computation to be distributed through the system. The application data flow graph can describe how data needs to flow through the system between the computational nodes for the complex computation to be executed. The points at which data can enter or exit the application data flow graph can be referred to as endpoints of the network. The endpoints can be any component of the system that requires data from the network or that administrates the transfer of data to a system on the network. In keeping with the example above of a multicore processor, the endpoints could be the processing pipelines of the processing cores, CPUs located on the processing cores, the core controllers, or any other functional block that needs access to data from the network.

The application data flow graph can be efficiently executed using dedicated hardware components on the various computational nodes. The dedicated hardware components can include hardware subcomponents of varying degree of programmability, such as software-programmable general-purpose controllers or specialized programmable controllers. The programmable controllers can be configured using instructions provided to the controllers. The programmable controllers can then independently and asynchronously execute the instructions. These hardware subcomponents can each be configured to implement one transition of data in a set of transitions of data that combine to implement the data flow of the application data flow graph. The programmable controllers can be reconfigured using additional instructions to implement additional transfers of data during the execution of the application data flow graph.

The dedicated hardware components can isolate the computation layer of the network of computational nodes from the bulk of the memory management and data distribution operations required to execute an application data flow graph. In specific embodiments of the invention, the computation layer will only need to configure hardware subcomponents, such as by providing instructions to programmable controllers, and then monitor for requests for data or data availability messages from the hardware subcomponents which indicate that those instructions have been executed. Accordingly, all other memory management and data distribution tasks can be removed from the purview of the computation layer. In specific embodiments of the invention, this decrease in involvement by the computation layer will make the entire network of processing cores more efficient.

In specific embodiments of the invention, a method for executing an application data flow graph on a set of computational nodes is provided. Each computational node in the set of computational nodes includes: (i) at least one programmable controller from a set of programmable controllers; (ii) at least one memory from a set of memories; (iii) at least one network interface unit from a set of network interface units; and (iv) at least one endpoint from a set of endpoints. The method also comprises configuring the programmable controllers with instructions and independently and asynchronously executing the instructions using the set of programmable controllers in response to a set of events exchanged: (i) between the programmable controllers themselves; (ii) between the programmable controllers and the network interface units; and (iii) between the programmable controllers and the set of endpoints. The method also comprises transitioning data in the set of memories on the computational nodes: (i) in accordance with the application data flow graph; and (ii) in response to the execution of the instructions.

In specific embodiments of the invention, a system for executing an application data flow graph on a set of computational nodes is provided. The system comprises a set of endpoints, wherein each computational node in the set of computational nodes includes at least one endpoint from the set of endpoints. The system also comprises a set of network interface units, wherein each node in the set of computational nodes includes at least one network interface unit from the set of network interface units. The system also comprises a set of programmable controllers, wherein the programmable controllers in the set of programmable controllers are configurable using instructions, wherein each node in the set of computational nodes includes at least one programmable controller from the set of programmable controllers, and wherein the set of programmable controllers independently and asynchronously execute the instructions in response to a set of events exchanged: (i) between the programmable controllers themselves; (ii) between the programmable controllers and the network interface units; and (iii) between the programmable controllers and the set of endpoints. The system also comprises a set of memories, wherein each node in the set of computational nodes includes at least one memory from the set of memories, and wherein data is transitioned in the set of memories on the computational nodes: (i) in accordance with the application data flow graph; and (ii) in response to the execution of the instructions.

In specific embodiments of the invention, a computational node for executing a portion of an application data flow graph in cooperation with a set of computational nodes is provided. The computational node comprises at least one programmable controller from a set of programmable controllers, at least one memory from a set of memories, at least one network interface unit from a set of network interface units, and at least one endpoint from a set of endpoints. The at least one programmable controller is configurable using instructions which are independently and asynchronously executed in response to a set of events exchanged: (i) between the programmable controllers themselves; (ii) between the programmable controllers and the network interface units; and (iii) between the programmable controllers and the set of endpoints. Data is transitioned between the at least one memory and other memories in the set of memories in accordance with the application data flow graph and in response to the execution of instructions.

DETAILED DESCRIPTION

Figure 1:
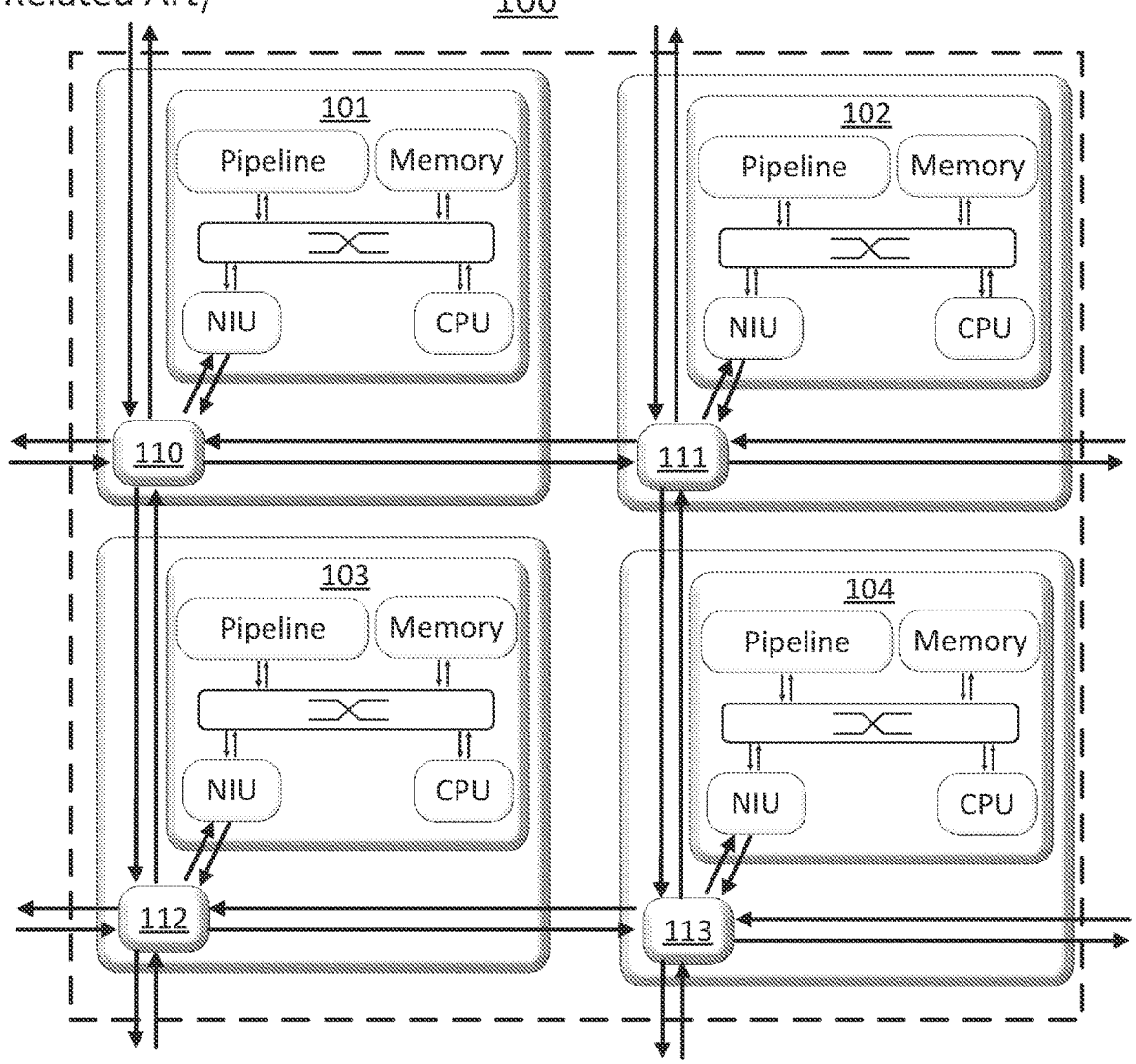
FIG. 1 includes both a block and layer diagram of a portion of a multicore processor connected by a network-on-chip (NoC) in accordance with the related art.
Figure 1:
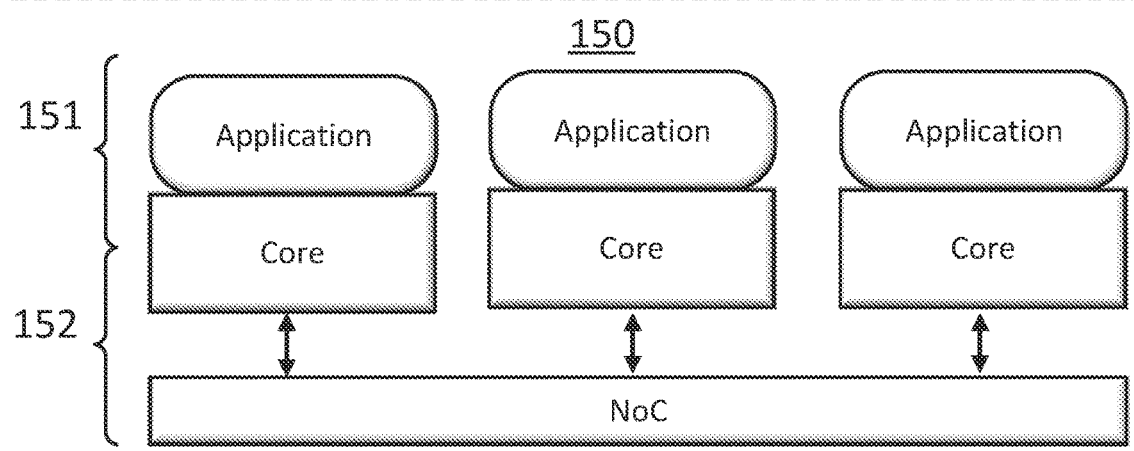

Methods and systems related to the field of data management for networks of computational nodes in accordance with the summary above are disclosed in detail herein. The methods and systems disclosed in this section are nonlimiting embodiments of the invention, are provided for explanatory purposes only, and should not be used to constrict the full scope of the invention. Although the specific examples provided in this section are directed to a network of computational nodes in the form of a NoC connecting a set of processing cores, the approaches disclosed herein are broadly applicable to networks connecting any form of computational nodes. Furthermore, networks in accordance with this disclosure can be implemented on a single chip system, including wafer-scale single chip systems, in a multichip single package system, or in a multichip multi-package system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer.

Throughout this disclosure the term "layer" is used in accordance with the standard usage of that term by those of ordinary skill in the art including usages with reference to the Open System Interconnection model (OSI) for telecommunications and networked computing systems generally. Specifically, the term "layer" refers to a system executing a set of instructions stored in memory or otherwise instantiated by hardware, including instructions instantiated in sequential logic and/or read only memory (ROM), that serve as a layer of abstraction for adjacent layers, via an interface, to thereby allow for the separation of concerns and facilitate interoperability. The layers can comprise the aforementioned instructions and an interface to at least one adjoining layer. Throughout this disclosure a combination of layers that are capable of operative communication, including the interface or interfaces between those layers, will be referred to as a "stack."

In specific embodiments of the invention, the disclosed network of computational nodes is in the form of a set of processing cores in a multicore processor connected by a NoC. The processing cores can each include an NIU for interfacing with a router, a processing pipeline, and a memory. The memory could be a cache memory of the processing core such as a random-access volatile memory such as static random access memory (SRAM). The processing cores could also include additional or more specific elements such as a higher-level controller, serializer/deserializer, nonvolatile memory for modifiable configuration information, and any number of arithmetic logic units and other fundamental computation units. The processing cores could also include one or more endpoints that can ultimately coordinate or execute operations within the core, such as a core controller. In specific embodiments, the core controller can be a dedicated Central Processing Unit (CPU). In either case, the core controller or CPU can administrate the transfer of data to a main processing pipeline of the processing core. The processing pipelines can be used to execute component computations required for the multicore processor to execute a complex computation. The NoC can include routers on each of the processing cores and a system of buses that either solely connect adjacent processing cores in the multicore processor for facilitating multi-hop communications or also connect distal processing cores for facilitating single-hop communications between those distal processing cores.

In specific embodiments of the invention, dedicated hardware components can be used to efficiently execute an application data flow graph on a set of computational nodes. The dedicated hardware components can take the form of specialized circuit blocks including hardware subcomponents on the various computational nodes of the network. The dedicated hardware components can form a network overlay layer to isolate a computation layer of the network of computational nodes from the network layer. For example, the dedicated hardware components can instantiate a network-on-chip overlay layer that serves to logically isolate the computation layer and the network-on-chip layer. The network-on-chip overlay layer can be distributively instantiated across the processing cores in the multicore processor. The network-on-chip overlay layer can be implemented by dedicated hardware components in the form of a set of NoC overlay units (NOUS) distributed across the set of processing cores. The network-on-chip overlay layer can isolate the computation layer from lower level memory management tasks to render the overall system more efficient at executing a complex computation.

In specific embodiments of the invention, the hardware subcomponents can be programmable controllers. For example, they can be programmable general-purpose controllers or specialized programmable controllers. The programmable controllers can be configured using instructions provided to the controllers. The instructions can be provided by higher-level controllers such as a core controller on a processing core. The instructions can be provided by a computation layer of the system. The programmable controllers can then independently and asynchronously execute the instructions. The execution of the instructions can allow the programmable controllers to execute an application data flow graph for the computation layer of the system. As described elsewhere in more detail herein, the instructions can cause a programmable controller to inform alternative controllers of its status, administrate the streaming transfer of data through the network layer, or administrate memory copy operations from one location in memory in the network layer to another. In specific embodiments, the programmable controllers can be programmable stream controllers as will be described below with reference to FIGS. 5 and 6.

Figure 2:
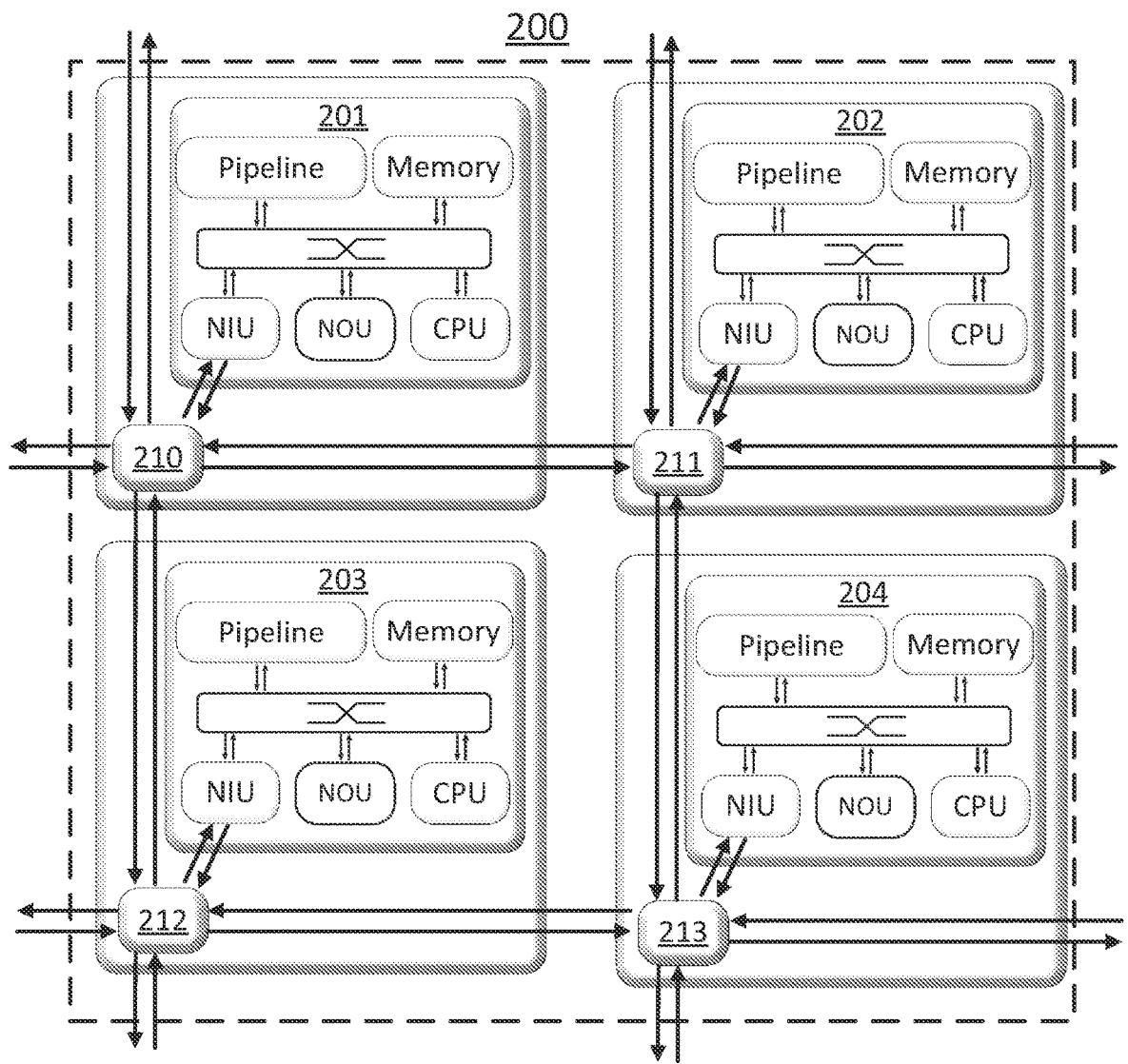
FIG. 2 includes both a block and layer diagram of a portion of a multicore processor connected by a NoC with a NoC overlay layer implemented using dedicated hardware in accordance with specific embodiments of the invention disclosed herein.
Figure 2:
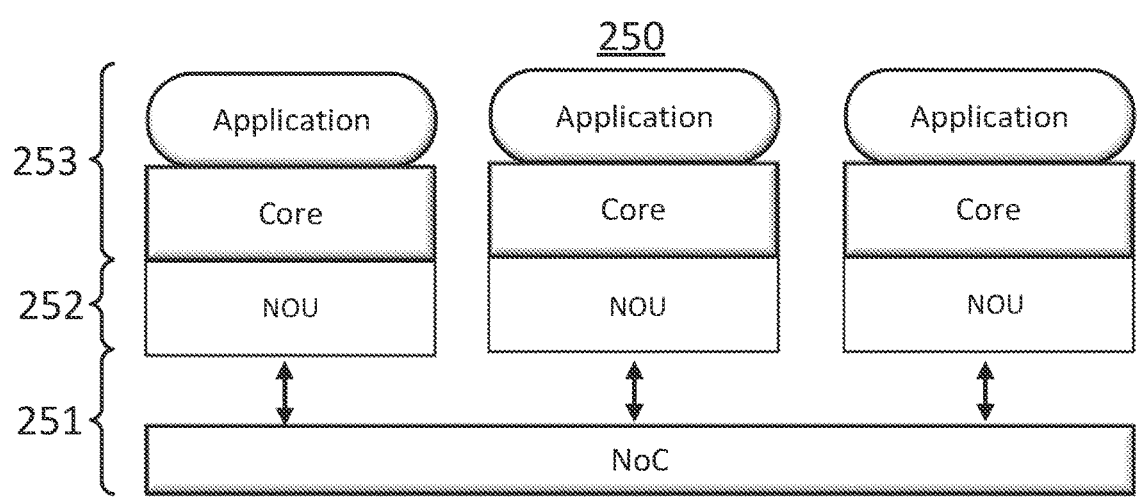

FIG. 2 illustrates both a block diagram 200 and layer diagram 250 of a portion of a multicore processor connected by a NoC including a NoC overlay layer implemented using dedicated hardware in accordance with specific embodiments of the invention.

Block diagram 200 of FIG. 2 is different from the block diagram 100 of FIG. 1 in that the computational nodes include a dedicated hardware component, that can be included for physically isolating the workload of the NoC layer components, such as the NIU, from the workload of the computation layer components on the computational nodes. In the specific example of FIG. 2, the dedicated hardware component is an NOU. The dedicated hardware component, such as the NOU of FIG. 2, can include hardware subcomponents. The hardware subcomponents can individually execute instructions for achieving the desired functionality of a NoC overlay layer.

Layer diagram 250 of FIG. 2 is different from layer diagram 150 of FIG. 1 in that it includes a NoC overlay layer 252 that can isolate computation layer 253 form the NoC layer 251 either physically or logically.

As with FIG. 1, the blocks in FIG. 2 with sharp corners indicate hardware elements and blocks with rounded corners indicate software elements. Also, software elements are stacked above the hardware used to instantiate the software elements and elements in the stack that are in contact are communicatively connected via interfaces. In specific embodiments of the invention, the NoC overlay layer can be entirely hardware-instantiated. In layer diagram 250, the NoC overlay layer can be entirely hardware-instantiated via the set of NOUs shown in block diagram 200. The NOUs can include registers and sequential logic and can route data to and from the memory or processing pipeline of the computational node to the NIU of the computational node. The NOUs can be implemented by augmenting the NIUs of an existing design or by adding an entirely new block to implement the NOUs and communicate with the existing NIUs in an existing design. The NOUs can include programmable controllers that can be configured and reconfigured through the delivery of instructions to those controllers. The controllers can have a customized instruction set for implementing NoC overlay layer 252. In specific embodiments of the invention, a set of NOUs on the set of computational nodes in the multicore processor can physically isolate the set of NIUs and the set of routers 210, 211, 212, and 213 from a set of memories and a set of processing pipelines on the computational nodes.

In specific embodiments of the invention, the NoC overlay layer and the NoC layer are communicatively connected via an interface. The interface could be configured to allow for the flow of data in either direction across the interface. The NoC layer could provide inbound information from alternative computational nodes and accept output information destined for alternative computational nodes. The NoC overlay layer could provide inbound information from the computation layer destined for alternative computational nodes and accept outbound information destined for the computation layer. The NoC overlay layer can thus serve to provide a communicative connection between the NoC layer and computation layer while still logically isolating the two layers. In specific embodiments of the invention, the interface can include a register file of the NoC layer that is configured to receive instructions to implement the transfer of data to specific cores in the multicore processor. The register file could include a register to receive the data to be written to the alternative core and a register to receive an identifier for the specific core or cores. Alternatively, in place of the register to receive the data to be written to the alternative core, the register file could include an address and size of a buffer in a computational node's local memory to receive the data to be written to the alternative node.

In specific embodiments of the invention in which the NoC overlay layer is entirely hardware instantiated, the computation layer and the NoC overlay layer are communicatively connected via a hardware interface. The interface could include a register file on the NoC overlay side of the interface where the computational node was configured to write or read from the register file. Alternatively, the computational node could be configured to write or read from a local buffer identified by an address in the register file. Specific registers in the register file could be polled periodically to check to see if a command was in-bound from the NoC overlay layer side of the interface. The register file could include a first set of registers and a second set of registers. The computation layer could be configured to write to the first set of registers and read from the second set of registers. The NoC overlay layer could be configured to read from the first set of registers and write to the second set of registers. In this manner data could be passed in either direction across the interface to facilitate a communicative connection between the layers. Additional registers could be provided on either side of the interface regarding the content of those first two sets of registers including an address of which register should be read or written to or an indicator that a specific predetermined register address is ready to be read or written to.

A system in accordance with specific embodiments of the present invention can include various components for executing an application data flow graph on a set of computational nodes, such as processing cores 201, 202, 203 and 204 of FIG. 2. The system can include a set of endpoints, and each computational node can include at least one endpoint from the set of endpoints. The system can also include a set of NIUs, and each computational node can include at least one NIU from the set of NIUs. The system can also include a set of dedicated hardware components for implementing a NoC overlay layer and administrating the execution of an application data flow graph, that can include a set of hardware subcomponents such as a set of programmable controllers. The system can also include a set of memories, and each computational node can include at least one memory from the set of memories. The system can allow for data to be transitioned in the set of memories on the computational nodes in accordance with the application data flow graph and in response to operations of the dedicated hardware components, subcomponents, and execution of instructions by the programmable controllers.

The dedicated hardware components can be components that allow for the independent execution of an application data flow graph with no need to involve the computation layer of the system. In the example of FIG. 2, the dedicated hardware components are in the form of NOUs distributed across the set of processing cores. The dedicated hardware components, such as the NOUs, can include hardware subcomponents. The hardware subcomponents can be configured by instructions. Other components of the system, such as CPUs or higher-level controllers on the computation nodes, such as core controllers, can be involved in the configuration of the programmable controllers by providing instructions to the programmable controllers. For example, the CPUs or other controllers could load instructions into memory which describe the desired behavior of the controller in order to execute a portion of the application data flow graph, and the dedicated hardware components could be designed to sequentially read and execute those instructions from the memory at a dedicated address. The programmable controllers could be reconfigured numerous times during the execution of an application data flow graph to implement additional transfers of data by having the higher-level controller provide an additional set of instructions to the programmable controller. The execution of those instructions can cause a programmable controller to inform alternative controllers of its status, administrate the streaming transfer of data through the network layer, or administrate memory copy operations from one location in memory in the network layer to another.

The CPUs or higher-level controllers described in the prior paragraph can be part of the computation layer of the system. In this way, the computation layer can configure the programmable controllers, and then leave them to execute without further guidance from the computation layer thereby leaving the computation layer free from memory administration and low-level network management tasks. In specific embodiments of the invention, the CPUs or other higher-level controllers can be considered servants of the programmable controllers once the programmable controllers have been configured. For example, the programmable controllers could be configured to control a program counter or a stalled status of the CPU which would allow for more independence between the execution of the application data flow graph as the computation layer can essentially be paused if data is not yet available from the network.

The programmable controllers described above can independently and asynchronously execute the instructions which configured the programmable controllers. The programmable controllers can be configured to execute the instructions in response to events exchange between the components of the system. For example, the events could be indicators of the status of an alternative controller as having data available for downstream transmission or as being configured to facilitate the streaming transfer of data. These events can also be referred to as tokens. The tokens can include an identifier of the sender of the token to provide redundancy and/or additional flexibility to the overall set of instructions used to execute a given application data flow graph. Once configured, the programmable controllers can generate events in response to events received from other elements of the system independently and asynchronously and move through their set of instructions without reference to a global clock or higher-level controller. For example, the instructions could be executed in response to events exchanged between the programmable controllers themselves, either within a single computational node or among a plurality of computational nodes, such as the processing cores in a NoC. The programmable controllers could also be executed in response to events exchanged between the programmable controllers and the NIUs of the computational nodes. The programmable controllers could also be executed in response to events exchanged between the programmable controllers and the endpoints of the computational nodes.

In specific embodiments of the invention, the hardware subcomponents can implement state machines. The state machines can be implemented by the hardware components in general. In specific embodiments each hardware subcomponent can implement a single state machine (i.e., each hardware subcomponent can implement a single state machine from a set of state machines implemented by the hardware component). The state machines can be configurable, for example, through the configuration of the dedicated hardware components or hardware subcomponents. Other components of the system, such as CPUs or other controllers on the computation nodes can be involved in the configuration of the state machines, or in controlling the state or state flow of the state machines. For example, the CPUs or other controllers could load instructions into memory that describe the state flow of a state machine, and the dedicated hardware components could be designed to sequentially read and execute those instructions from the memory at a dedicated address. The CPUs or other controllers can be part of the computation layer of the system. In this way, the computation layer can configure the state machines, and then leave them to execute without further guidance from the computation layer thereby leaving the computation layer free from memory administration and low-level network management tasks. In specific embodiments of the invention, the CPUs or other controllers can be considered servants of the state machines once the state machines have been configured. For example, the state machines could be configured to control a program counter or a stalled status of the CPU which would allow for more independence between the execution of the application data flow graph as the computation layer can essentially be paused if data is not yet available from the network.

One or more programmable controllers can be included in each computational node, such as each processing core in the NOC of FIG. 2. In specific embodiments of the invention, a set of programmable controllers is distributed across the system, and each computational node can include a subset of programmable controllers from the set of programmable controllers in the system. The subset of programmable controllers can be implemented by the dedicated hardware component on each computational node. In this way, the dedicated hardware component or the programmable controllers can execute the instructions to implement a portion of the application data flow graph on each computational node. In specific embodiments of the invention, the dedicated hardware component can implement a subset of programmable controllers in a computational node, and each of the hardware subcomponents in the dedicated hardware component can implement one programmable controller in the subset of programmable controllers in the computational node.

In specific embodiments of the invention, the dedicated hardware components mentioned above can provide translations between events utilized to orchestrate the independent and asynchronous execution of the programmable controller instructions and the commands and messages of a network layer. In specific embodiments, the dedicated hardware components can translate events into NoC commands, for example commands for an NIU to administrate a memory copy operation from one processing core to another. In specific embodiments of the invention, the dedicated hardware component can also translate data flow control information from the NoC layer, such as from the NIU, into events. For example, data flow control information indicating that data was written to a specific address could be translated to an event informing a programmable controller that its upstream data was available. In specific embodiments of the invention, the dedicated hardware component communicates with the endpoint using a register file. Alternatively, a direct interface can be provided between the dedicated hardware component and the endpoint so that they can communicate directly, for example using interrupts.

As used herein the term "event" includes any message indicating that a state machine has changed state, that a programmable controller has executed an instruction, or indicating any change, update or occurrence in the system that influences or is related to the execution of the application data flow graph and/or the data transition operations. For example, events can indicate when data is available to be delivered to the computational node, or when data is available to be sent out from the computational node. Events can also indicate when a computation layer component needs specific data to be requested from a remote computational node. Events can also indicate when remote computational nodes need a location in memory to store data. Events can indicate the status of data and components of the system so that data can be transitioned from one component to the other when both the data and the component are ready. Events can also be delivered in the form of tokens. The tokens can be simple messages which identify the source of the token without additional information or include additional data regarding the status of the sender or the status of data administrated by the sender.

Events can be received by a NoC overlay layer from a NoC layer. For example, when an NIU receives incoming data the NIU can send or cause the system to send an event to the dedicated hardware components, such as the NOU, to proceed to execute a part of the application data flow graph in accordance with the data received by the NIU at a NoC layer level. The events can also be commands from the NoC overlay layer, such as from the NOU, that instruct the NoC layer to transport data from one computational node to another. The events can also be control signals received from a controller that instruct the NoC overlay layer and ultimately the NoC layer to transition data.

As the term is used herein, an "endpoint" can be any component that ultimately consumes or produces data in the application data flow graph or that serves to administrate the direct transfer of data between such an entity and a memory that is accessible to the network. The endpoints can be any intended recipient of data or any potential provider of data in the execution of the application data flow graph, including a processing pipeline, a CPU, a memory, a basic logic unit or any entity of the system that may benefit from the execution of, or produce or consume the data in, the application data flow graph. The endpoints can be any entity that the NIU is configured to deliver data to. The endpoints can be any entity that the NIU is configured to receive data from. The endpoint can be, for example, a processing pipeline of a computational node. In the example of FIG. 2, the set of endpoints can be the set of processing pipelines distributed across the processing cores 201, 202, 203, and 204 in the NoC.

In specific embodiments of the invention, each computational node can include one or more endpoints and one or more controllers. For example, although the processing cores are illustrated in FIG. 2 as including a single processing pipeline and CPU, each computational node can include a plurality of processing pipelines and/or CPUs. The computational nodes could, for example, include dedicated controllers for different functions of the system. These kinds of controllers can be referred to herein as "computation layer controllers" or "core controllers" to distinguish them from the programmable controllers that implement the network overlay layer. For example, in embodiments which include a dedicated hardware component for implementing a network overlay layer, one or more computation layer controllers can be provided for configuring that dedicated hardware component. In embodiments in which the dedicated hardware component includes a set of programmable controllers, one or more computation layer controllers can be used to provide instructions to the programmable controllers to configure them for asynchronously implementing the network overlay layer. This same computation layer controller can then monitor for messages from the network overlay layer which indicate that data is available from the network overlay layer and/or provide message to the network overlay layer that data is ready to be sent through the network layer.

In specific embodiments of the invention, an endpoint for the application data flow graph can also be a computation layer controller that configures the dedicated hardware components and subcomponents that implement the overlay layer, or that otherwise controls the operation of the dedicated hardware components and subcomponents. However, in other specific embodiments of the invention, the endpoint for the application data flow graph is not responsible for configuring the dedicated hardware components or subcomponents, and a different controller which is not necessarily an endpoint for the application data flow graph can be used for that purpose. In specific embodiments of the invention, the endpoint can also be a CPU that receives events and controls the transfer of data from one or more memories of the system to one or more computation pipelines on the computational nodes.

The term "endpoint" as used herein should not be construed as defining an element that is located at the "end" of a path or branch. The endpoints can, for example, inject data in the application data flow graph for another endpoint in the system. The endpoints could, for example, push data into a memory of the system or prepare data for a subsequent action for the system once it is in receipt of the data. In specific embodiments of the invention, the endpoints are not necessarily components of the system that passively wait for the delivery of data, but can be implemented as active components of the system that can pull data from memory or query other components of the system for data or updates related to such data. As another example, the endpoint can implement dedicated functions to query the dedicated hardware components as to the status of data. For example, a function can be used to instruct the dedicated hardware components or any of the hardware subcomponents to read data from a specific location in memory, and the dedicated hardware components or any of the hardware subcomponents could issue an indication that the data is ready or a "stall" indication informing the endpoint that any component computation or other process that required the data should be temporarily suspended. Additionally, or in combination, the endpoints could receive direct interrupts from the dedicated hardware components or any of the hardware subcomponents. For example, interrupt pins on an endpoint could receive signals from the hardware subcomponents on the dedicated hardware component to implement the interface between the dedicated hardware components and the endpoints.

A method for executing an application data flow graph on a set of computational nodes, in accordance with specific embodiments of the invention, can be implemented by the components of the system described before and with reference to FIG. 2. The method can include the steps of configuring a set of programmable controllers with instructions, executing the instructions using the programmable controllers, and transitioning data in the set of memories of the system.

Figure 3:
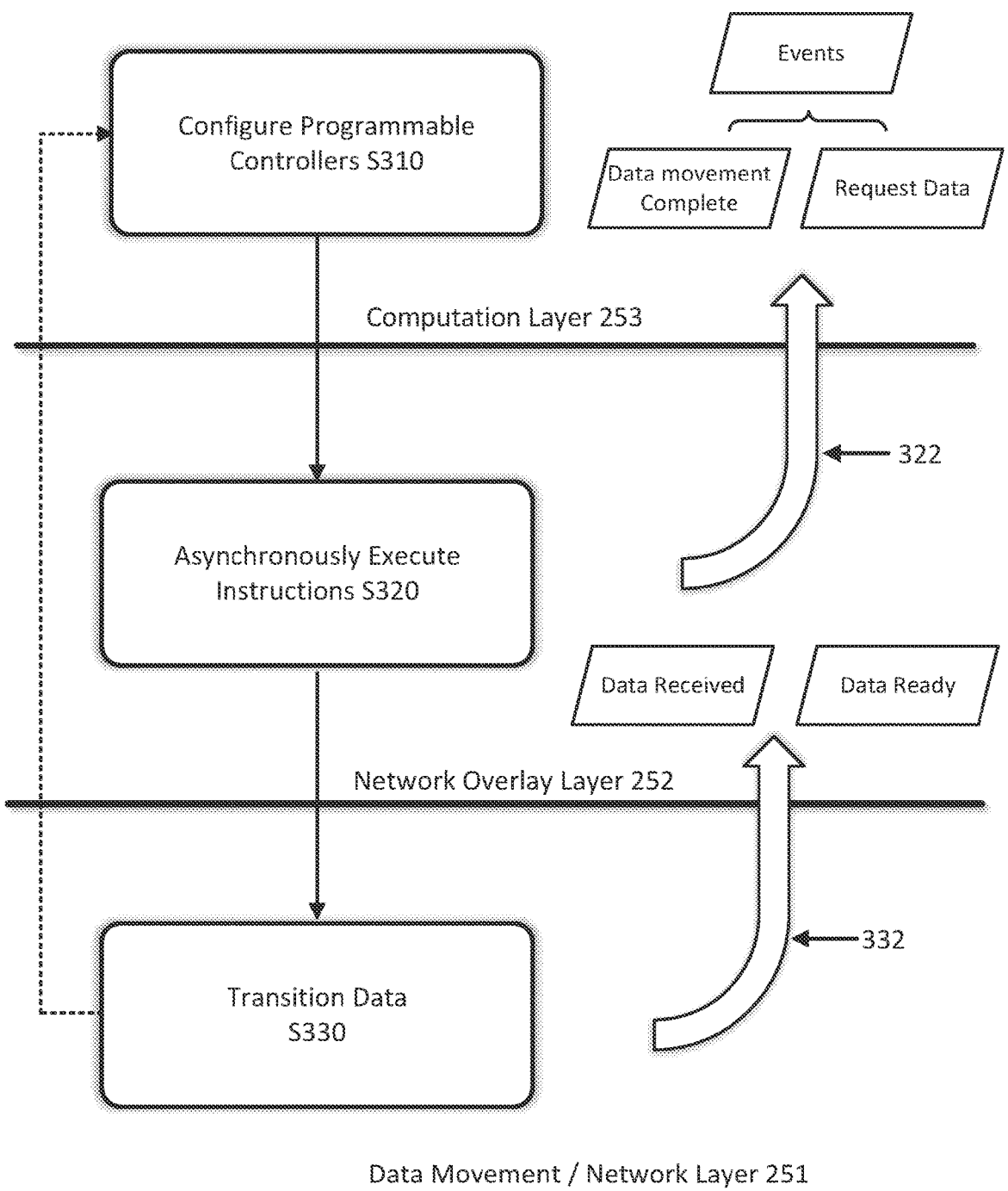
FIG. 3 includes a flow chart for a set of methods for executing an application data flow graph in accordance with specific embodiments of the invention disclosed herein.

FIG. 3 illustrates an example of a flow chart 300 for a set of methods for executing an application data flow graph in accordance with specific embodiments of the invention. In the example of flow chart 300 of FIG. 3, a correspondence between the method steps and the layer diagram of FIG. 2 is also established, although the layers of the layer diagram can be involved in the execution of the methods in a different manner, such as by involving physical components of the different layers in the execution of one or more steps.

Flow chart 300 starts with step S310 of configuring the set of programmable controllers with instructions. This step can be implemented by the computation layer. Flow chart 300 continues with step S320 of asynchronously executing the instructions using the programmable controllers. This step can be implemented by a network overlay layer. Flow chart 300 continues with step S330 of transitioning data. This step represents the movement of data between the various memories of the system movement and can be implemented by a NoC layer.

Flow chart 300 illustrates a method implemented by the different layers of the layer diagram of FIG. 2 wherein the computation layer 253 is isolated from the data transition management operations in the network layer 251 by providing a network overlay layer 252. This implementation can include physically moving data between memories on different computational nodes and/or identifying data on a local node for an endpoint of the local node and locally providing such data. Thus, the network layer can be involved with both the transition of data between different nodes and movement of data locally on a node, for example, between a cache memory and computation pipeline of a certain processing core. The transitions of data can involve streaming transfers of data through the network using the packetized transfer of units of computation layer data or memory copy operations between buffers in the memories of the processing cores either locally or between different processing cores. In this way, the endpoints of the system are able to access data at specific locations in the memories of the system and thereby execute the application data flow graph.

Step S310 of configuring the programmable controllers can be conducted using the computation layer components of the computational nodes. For example, a computation layer controller such as a CPU or a dedicated controller can execute this step. In specific embodiments of the invention, the computation layer 253 will only need to configure the set of programmable controllers and then monitor for requests for data or data availability messages from specific programmable controllers. In this way, the computation layer is not responsible for data movement management within the system, and more specifically, for executing the application data flow graph, which can result in the availably of computation resources necessary for actual computation of data that would otherwise be allocated for transitioning the data before, after and during its processing in the computation layer.

The programmable controllers can be configured in numerous ways. For example, the set of programmable controllers can be configured by a controller of a processing cores, such as a CPU of each processing core. The programmable controllers can be configured to read from one or more specific addresses in a memory of the system. Configuration instructions can be pre-stored in the memory addresses or can be dynamically written by a different component of the system, such as a computation layer controller, such that the programmable controllers can read the configuration instructions from the memory address and configure themselves in accordance with such instructions.

In embodiments in which the configuration instructions are dynamically generated by the system, the dedicated programmable controllers will be able to read such configurations and provide a highly configurable set of functionalities in accordance with the system needs and current status. The programmable controllers can be configured to continuously read instructions from memory as they execute their instructions and administrate the transfer of data in the network layer. The controller/CPU can control the location in memory where the instructions are being read to thereby control the configurations of the programmable controllers. The controller/CPU can induce the programmable controllers to start reading from another location in memory to change the configuration of the programmable controllers. The controller/CPU can also write the instructions themselves to thereby configure the programmable controllers. The controller/CPU can also, by writing different sets of instructions and/or by passing different addresses for the instructions to be read from to the programmable controllers, control a schedule of configurations for the dedicated hardware components to execute. In other words, the controller/CPU can cause a programmable controller to execute different portions of an application data flow graph at different times during the execution of that application data flow graph.

In specific embodiments of the invention, a single computational node can include multiple programmable controllers. In those embodiments, a computation layer controller of the system, such as a dedicated controller in the node or the CPU, can write instructions or configuration settings in multiple addresses in memory so that all the programmable controllers in the node can be configured in a coherent manner. In a similar fashion, in embodiments in which a single computational node includes more than one CPU or multiple controllers, the CPU and controllers can logically write instructions or configuration setting in memory in accordance with their current status, so that the dedicated hardware components or subcomponents implementing the state machines can be configured and perform accordingly.

In specific embodiments of the invention, the programmable controller will be configured by the instructions to execute a state machine. The instructions can cause the state machine to provide an output according to its current state and then transition to a different state for upcoming events, the different state being conditioned, for example, on the current state or input of the system. For example, an instruction to configure a dedicated hardware component or subcomponent implementing a state machine can be of the kind: "Change to state S2 in response to event E2". As a different example, an instruction can be of the kind: "If current state is S1 and event E1 is received, send out event E2 and transition to state S2".

Events can be exchanged (received/sent) between different programmable controllers in a single computation node or in a plurality of computation nodes, between the programmable controllers and the network layer components, for example NIUs, and between the programmable controllers and the different endpoints of the system. The exchange of events can be used to trigger the execution of instructions by the programmable controllers. In specific embodiments of the invention, the execution of the instructions by the programmable controllers will be triggered and gated by the events instead of with reference to a clock or a global administrator. In embodiments in which the instructions implement a state machine the exchange of events can cause the state machines to march through the state flow of the state machine.

Events can be exchanged between programmable controllers within a single computational node, which can be implemented by programmable controllers of a dedicated hardware component such as an NOU, or between programmable controllers of a plurality of computational nodes. The programmable controllers can be connected to each other by a physical connection that allows them to exchange data. For example, wires can be provided for interconnecting the programmable controllers of a dedicated hardware component. As another example, a crossbar connecting element able to interconnect multiple inputs and multiple outputs of the different programmable controllers can be used to exchange events between programmable controllers on the same computational node.

Events can also be exchanged between programmable controllers and network layer components, such as the NIUs. For example, incoming data transfers, received by a router and NIU, can be translated into events for the programmable controllers of the computational node that received the data. A programmable controller in a set of programmable controllers of a computational node can be in a state where it is waiting for data from a programmable controller Z. The NIU can generate an event indicating that data from a remote computational node was written to an address X in memory Y. The NIU, or an element designed to translate NIU information into events, can identify that the data which was sent from the remote node to address Y is from programmable controller Z and generate an event for the programmable controller indicating that the data it is waiting for is available. This event can then be used by the programmable controller to continue stepping through its instructions. As another example, an event indicating programmable controller A should be provided with data can be translated into a network layer command to transfer the data to node B at memory address C, where programmable controller A can be implemented on node B and associated with memory address C. In this way, transitioning data to memory address C in node B results in the providing of data for programmable controller A because of the ex-ante association between the programmable controller and that memory address. Alternatively, a header or ID of the data to be transmitted/received can include the identification of a source/destination programmable controller or endpoint. Alternatively or in combination, the headers of packets that are visible to the network layer can identify a programmable controller that generated the packet, or indicate the node, memory, or memory address where the packed was previously stored, etc. Alternatively or in combination, the programmable controllers can exchange events with the NIUs by translating data flow control information from the network layer into events for the network overlay layer, and events from the network overlay layer into commands for the network layer. For example, data flow control information from the NIU can be translated into events for the programmable controller and events from the programmable controller can be translated into commands for the NIU. This translation can be carried out at the network overlay layer level, by a translator module in the dedicated hardware components.

Events can also be exchanged between the programmable controllers and the endpoints. The computation layer and the network overlay layer can share an interface that allows for the exchange of events. In specific embodiments of the invention, a register file can be provided between an endpoint and a programmable controller to manage the events exchange. In specific embodiments of the invention, the computation layer can be designed to stall and hold when it reaches a point where data is needed in order to proceed, but is not available from the network overlay layer. For example, a component computation being executed by a computational node can be stalled, and the system can be configured to monitor for an endpoint bound event, such that the component computation can then be restarted upon detecting the endpoint bound event. In the alternative or in combination, the computation layer can poll the network overlay layer for data when it is required. In the alternative or in combination, the network overlay layer can send interrupts to the computation layer with events information, for example, when data is ready for an endpoint the dedicated hardware component can indicate this fact to the endpoint using a dedicated signal line.

Step S320 of asynchronously executing the instructions with the programmable controllers can be implemented by a network overlay layer. In specific embodiments of the invention, the programmable controllers execute their instructions independently and asynchronously. The programmable controllers do not require a global clock for the performance of this function. The programmable controllers can pass information to each other to inform, for example, on the status of data, indicating data availability at a given location, a request for data, a transition of data to a new location, etc. In this way, each programmable controller can be independent from others in the same system, and even in the same computational node, and can execute at different time periods, under different states and in response to different events. In a similar fashion, output events from different programmable controllers can be provided at different times and responsive to completely different input events.

The programmable controllers can receive events from multiple nodes and issue events for multiple nodes. In this way, the programmable controllers will be able to process data injected into the application data flow graph from multiple producers of data (fan in), and to issue events for the delivery of data to be consumed from the application data flow graph by multiple consumers of data (fan out). Since the programmable controllers are able to independently and asynchronously execute, the programmable controllers can execute the application data flow graph efficiently even when the transitions of data in the set of transitions of data of the application data flow graph involve complex patterns of fan in and fan out at multiple nodes.

The programmable controllers can include the ability to process events in different ways to support variant data flow graphs including the ability to arbitrate among various input streams. In a basic case, the programmable controller can support a single path with a basic condition for passing data along the path (e.g., a programmable controller can immediately transition states in response to the receipt of an event indicating data has been received from a remote node, and the state transition can include the simple act of sending out a new event downstream to an endpoint indicating that the data it is waiting for is available). Alternatively, the programmable controllers can involve more complex relationships to received events. For example, a programmable controller can wait to transition states until a set of events have been received and can take different actions based on the received events. For example, the programmable controller can wait until a set of events have been received and only send a particular event downstream once all of the events have been received. This functionality will enable a memory transfer being administrated by the programmable controller to include gathering input data from multiple sources prior to transmitting the data onto another destination. Alternatively or in combination, a programmable controller can hold to administrate a transfer of data to multiple destinations until all of the destinations have confirmed their readiness to receive data. The receipt of data from multiple sources and the transition of data on to multiple sources can be arbitrated in various ways based on the logic of the programmable controller. For example, the programmable controller can be configured to allow for shorting data from a particular input channel without waiting, but otherwise gathering data for bulk transmission. As another example, the programmable controller can be configured to administrate a transfer of data from multiple input sources using a round robin, order of arrival, or identity arbitration scheme. For example, the identity arbitration could involve an event indicating an incoming transfer of data is associated with a data identification number, and the transmission of the data associated with that data identification number could be prioritized over other transfers based on the logic of the programmable controller.

Step S330 of transitioning data can be implemented as a local movement of data on a computational node or as a transition of data between different computational nodes. For example, the transition could be from a cache memory to a processing pipelines or other endpoint such as the CPU of a computational node. Alternatively, the transition could be between cache memories on different processing cores in a multicore processor as administrated by the NIUs on the two cores. The transition of data can be implemented in the network layer using a stream of packets of computational layer data or a set of distinct memory copy operations. The transition can involve making data available to be pulled to a local computational pipeline of a processing core by a computation layer controller. The transition could also involve writing to a memory address associated with a given programmable controller. In specific embodiments of the invention, the transition can involve generating NoC commands for moving data from a local memory to a different area, such as to a different memory in the system. In specific embodiments of the invention, events could indicate when data in memory is to be sent to a different node. An event could indicate data at a collection of locations in memory, that is to be sent out to a different node, is ready for sending. The network overlay layer can be responsible for managing those events and allowing the network layer to transition the data accordingly, while isolating the computation layer from the data transition tasks. The network overlay layer can issue commands for the network layer to execute the transition of data. For example, events from the programmable controllers in the network overlay layer can be translated into NoC commands for an NIU, and the NIU can execute the commands to transfer data from a memory on one computational node to a memory on another computational node.

In an approach in which the network is a NoC, NoC commands can be generated in response to events issued by the programmable controllers in a NoC overlay layer that trigger an action on the NoC layer. The actions can include a memory copy, memory status reservation, transfer of data X to core Y, etc. In specific embodiments of the invention, the NoC commands are instructions, to be executed by, but not limited to, the NIUs on the different computation nodes. In specific embodiments of the invention, a NoC command can be a command for transitioning data in accordance with the application data flow graph, to be executed by the NoC layer, which can ultimately deliver data to an endpoint in the computation layer.

An application data flow graph can be executed by following the overall methodology from flow chart 300, using a system as described with reference to specific embodiments of the present invention. The network layer 251 can receive incoming data that represents a transition of data in a set of transitions of data that conform to the application data flow graph and issue events for the network overlay layer 252 to execute the instructions using the programmable controllers accordingly, and thus administrate one transition of data in a set of transitions of data that conform to the application data flow graph. Arrow 332 in flow chart 300 represents a flow of events between the network layer 251 and the network overlay layer 252. As illustrated, network layer 251 can issue events to indicate, for example, that certain data was received, or that certain data is ready to be received, or that a certain node is ready for receiving data. The network layer can directly issue the events for the network overlay layer, and/or transmit the data flow information to the network overlay layer in a form other than events, so that the network overlay layer translates the data flow information into events for further processing. The translation can be carried out at the interface of the two layers by a dedicated module. Although arrow 332 goes in the direction of the network overlay layer 252, messages flow can be in either direction and the interface can be characterized by periodic polling from the network overlay layer 252 or interrupts received asynchronously from the network layer.

Arrow 322 in FIG. 3 indicates a flow of events between the network overlay layer 252 and the computation layer 253. After step S320 of asynchronously executing the instructions using the programmable controllers is performed, the programmable controllers can be reconfigured as described with reference to step S310 with additional instructions being provided to the programmable controllers. Additionally, the computation layer can be updated as to the status of the system or provided with data as necessary. For example, events indicating that a data movement is complete can be sent from the network overlay layer 252 to the computation layer 253 so that the computation layer 253 can proceed with subsequent steps in the computation, such as accessing the data in memory for a pending process in the processing pipelines. Similarly, events to request data can be communicated from the computation layer 253 to the network overlay layer 252 when the computation layer needs data to be received for further computation. Although arrow 332 goes in the direction of the computation layer 253 messages flow can be in either direction, and the interface can be characterized by periodic polling from the computation layer 253 or interrupts received asynchronously from the network overlay layer. For example, a register file could be provided on a controller of a processing core with a specialized address for a programmable controller to write to with an interrupt. The interrupt could indicate data is available at a given address or it could include an address at which the data is available.

Figure 4:
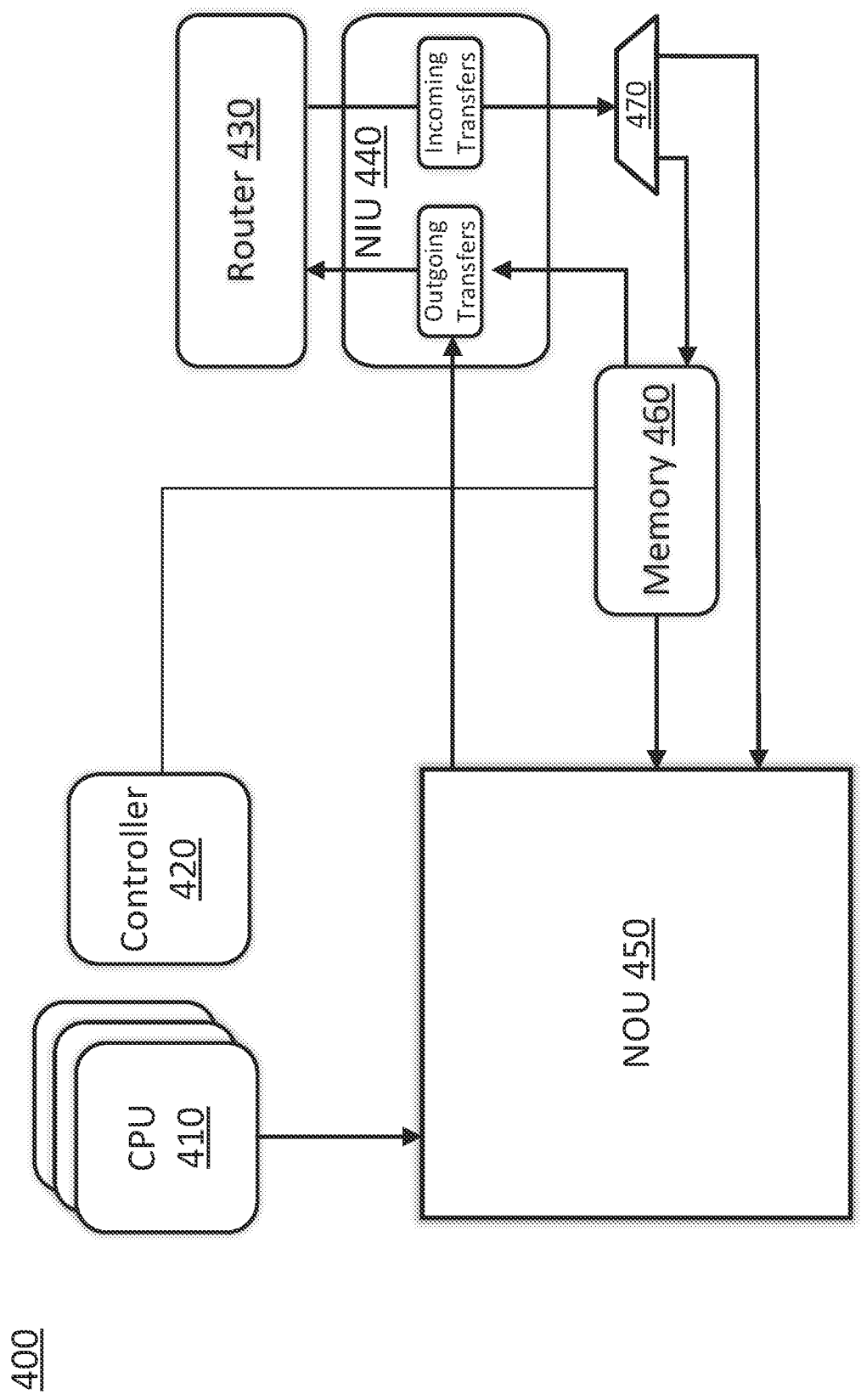
FIG. 4 includes a schematic view of components in a computational node in accordance with specific embodiments of the invention disclosed herein.

FIG. 4 illustrates a schematic view 400 of components in a computational node in accordance with specific embodiments of the invention. FIG. 4 illustrates an NIU 440 of a computational node in operative communication with a memory 460 of the computational node and in operative communication with a dedicated hardware unit, in the form of NOU 450, that can implement a network overlay layer and isolate the computation layer of the computational node from data management and application data graph execution tasks. FIG. 4 also illustrates NIU 440 in operative communication with a router 430 associated with the computational node. Incoming data provided from the router 430 through the NIU 440 to the computational node can be stored in memory 460. Information regarding this incoming data can simultaneously be delivered to NOU 450. The extraction of the information regarding the incoming data can be conducted by data flow observation element 470. This element could send data "A" to memory 460 and network layer data flow control information "Data A delivered to memory" to NOU 450. The NOU 450 could then translate this information into events utilized by the programmable controllers instantiated by NOU 450 to responsively administrate the application data flow graph.

FIG. 4 also illustrates a plurality of CPUs 410 and a controller 420 of the computational node. In the example of FIG. 4, the CPU 410 is illustrated as an endpoint communicating with the NOU 450, and the controller 420 is illustrated in operative communication with the memory 460. In this example, the controller 420 could be used to configure the programmable controllers in NOU 450 by writing to addresses in memory 460 from which the programmable controllers in NOU 450 obtain their configuration instructions. The controller 420 could also be used to control the computation pipelines (not shown) of the computational node. For example, data in memory 460 can be sent to a processing pipeline under the control of the controller 420. At the same time, data in memory 460 can be used to configure the programmable controllers of the NOU 450 under the control of controller 420. Although the CPU 410 and controllers 420 are shown as different elements of the computational node, they can be the same elements in other specific implementations of the invention. Although there is no direct connection between the CPU/controllers and the NIU in the example of FIG. 4, in specific embodiments of the invention, the CPU or controllers can directly issue commands to the NIU to override the operation of NOU 450 and the network overlay layer.

Events can be provided from the NIU 440 to NOU 450 in the form of network layer data flow information that has been translated into events. The data flow information can include an identifier for data that has arrived on memory 460, a location of the data in memory, a programmable controller the data flow information is intended for, a size of the data being transferred, an identifier of the programmable controller that administrated the transfer of the data, an identifier of the computational node that transmitted the data, an indication that data is available for transmission or that space is available on another computational node for an outbound transmission, and any other information that the programmable controller may utilize to administrate an application data flow graph. This information can be pulled from the network layer using data flow observation element 470. In the same manner, events, or events translated into network commands (e.g., NoC commands), can be issued from the NOU 450 to the NIU 440. The NIU 440 can also be configured to obtain data from the memory 460, and to receive network commands (e.g., NoC commands) or outputs from the NOU 450 to compose the outgoing transfers.

The NOU 450 can include dedicated hardware subcomponents designed to transport events between them and other entities of the computational node, such as the endpoints or the NIU 440. The hardware subcomponents can be programmable controllers designed to transition data and events based on its current state, for example as loaded from memory 460 or modified by controller 420 of the computational node.

In specific embodiments of the invention, the programmable controllers can be implemented in the form of programmable stream controllers. In these embodiments, each programmable stream controller can be configured to handle one transition of data. In this way, each programmable stream controller can administrate a single transfer of data in a set of transitions of data that form the application data flow graph in the aggregate. A "stream" when used in this context can be understood as a transition of data in the set of transitions of data that form the application data flow graph. The transition of data can be discrete memory copy operations of an entire buffer of computation layer data that are administrated by the programmable stream controllers in response to the receipt of an event or streaming operations in which the programmable stream controller administrates a continuous transfer of data through the network layer as soon as packet sized portions of the data that needs to be transferred becomes available. The programmable stream controller can be referred to as operating in a streaming mode in this situation. The packets can be packets of the network layer. The programmable stream controller can be configured to transfer an entire buffer of application data through the network while in a streaming mode and then terminate the streaming mode. The programmable stream controllers can, for example, monitor for when upstream and downstream streams or endpoints are available, and transfer data when a desirable condition is met. For example, the programmable stream controllers can issue an event to transfer data when both an upstream and a downstream programmable stream controller indicate that adjacent streams are available. As long as such a state is held stable, data can flow through the various streams packet-by-packet to implement the application data flow graph. In specific embodiments of the invention, streams can also be associated with a dedicated buffer such that adjacent streams do not need to be simultaneously available for the application data flow graph to continue execution. Streams can be implemented, for example, using buffers that temporarily store data to be transmitted in a specific transition of data. For example, in specific embodiments of the invention, each programmable stream controller can be associated with such a dedicated buffer, and can monitor for when data is available and copy the data even though a downstream stream is not available and/or transition stored data even if an upstream stream is not immediately available to continue a flow of packets.

In specific embodiments of the invention, the physical flow of events in the system can be in the same direction or opposite the flow of the data transfers. For example, a programmable stream controller which is downstream in the direction of dataflow can send an event back up indicating that an address is ready to receive data, while a programmable stream controller which is upstream in the direction of dataflow can send an event down indicating that a unit of data is ready to be transmitted. Conversely, a programmable stream controller which is downstream in the direction of dataflow can receive an event indicating that data is ready to be transmitted, while a programmable stream controller that is upstream in the direction of data flow can receive an indication that data at an address in memory is ready to receive data.

In specific embodiments of the invention, the location and state of the streams in the system can be tracked. For example, each computational node can inform the other computational nodes about the streams to be implemented in the core. In specific embodiments of the invention, an indexed data structure, such as a lookup table, can be provided in the network overlay layer comprising the stream's information. For example, an ID of the stream can be indexed to the specific memory location or other information of the computational node where the stream is to be implemented. The IDs of the streams can be indexed in a data structure such that the data structure is a map for the execution of an application dataflow graph, where the nodes of the graph are streams or specific transitions of data represented by the streams.

Figure 5:
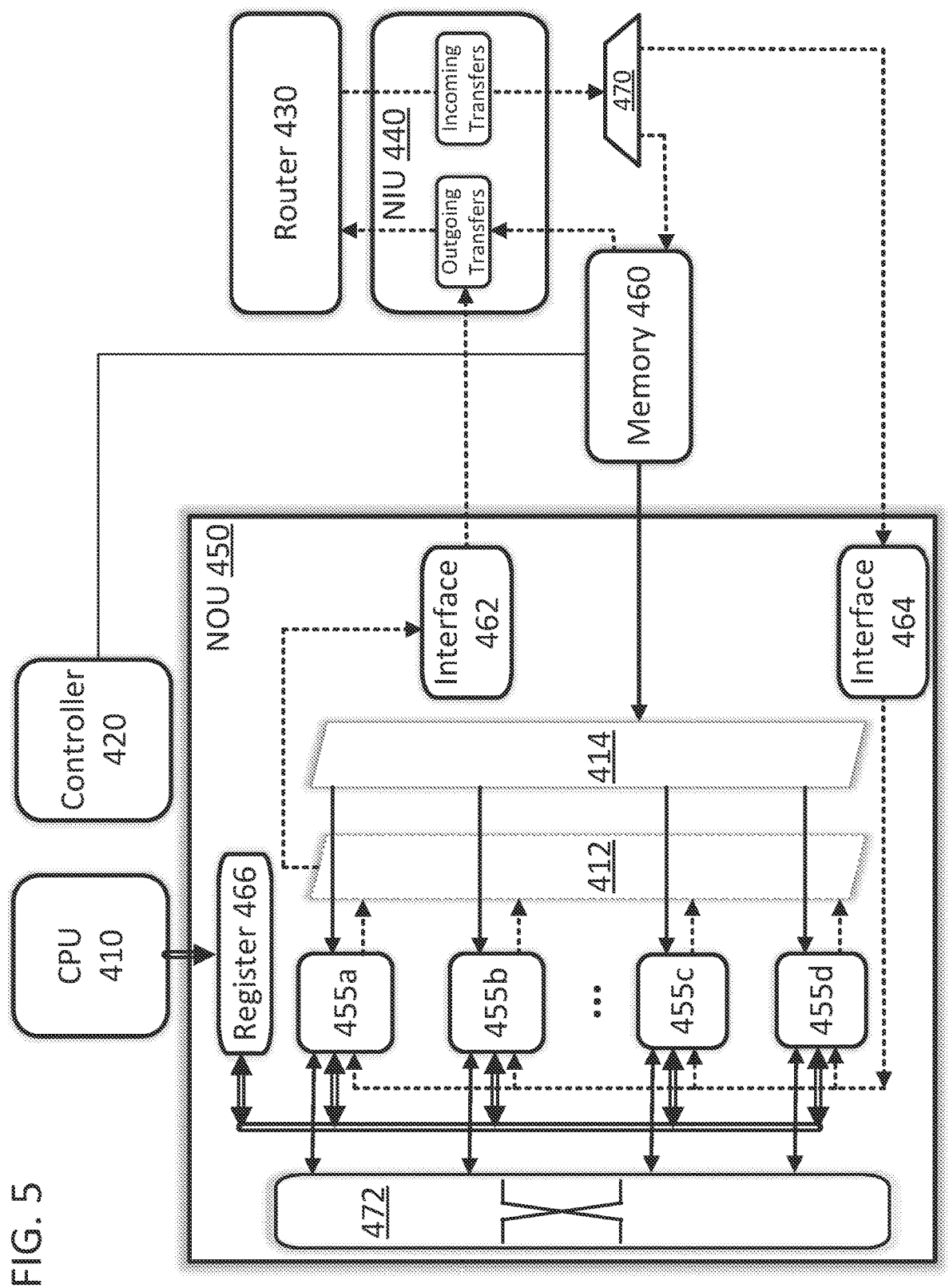
FIG. 5 includes a schematic view of components in a computational node including a dedicated hardware component and hardware subcomponents in accordance with specific embodiments of the invention disclosed herein.

FIG. 5 illustrates an example of an NOU 450 that includes programmable stream controllers 455a, b, c and d as hardware subcomponents that can implement the network overlay layer in the computational node, collectively referred to as programmable stream controllers 455. Four programmable stream controllers are shown for illustrative purposes only, and more or fewer can be included in other specific implementations of the invention. In specific embodiments of the invention, the programmable stream controllers can implement a set of state machines and each independently implement a single state machine from that set of state machines in a one-to-one correspondence. The programmable stream controllers 455 can communicate with each other by using a physical connection, such as the connection represented by crossbar 472, that allows them to exchange events to trigger the execution of instructions by the programmable stream controllers (e.g., movement through the state flow of a state machine implemented by such instructions). The stream administration units 455 can communicate with the endpoints, such as CPU 410, by using a register interface, such as register file 466. Alternatively, the programmable stream controllers 455 can communicate with the endpoints through a direct interface, by for example, sending interrupts to the CPU or directly receiving queries from the CPU.

The NOU 450 can also include dedicated modules for handling incoming and outgoing data, events and/or commands. For example, a module 464 can be configured to receive incoming data and translate it into events for the hardware subcomponents, such as programmable stream controllers 455. Module 464 can translate data flow control information from NIU 440 into a form that is usable by the network overlay layer, such as in the form of events. Module 464 can be a component of the interface between the network layer and the network overlay layer, by translating incoming data as received by the network layer, for example by the NIU 440, into control updates for the network overlay layer, for example in the form of events for the NOU 450. In specific embodiments of the invention, the hardware subcomponents such as programmable stream controllers 455 can be associated with specific buffers in memory or memory locations in memory 460. In those embodiments, when data is written to those memory locations, a notification can be sent to the hardware subcomponents for action, and module 464 can translate such notification into an event for the programmable stream controllers or other hardware subcomponents. Module 464 could also use a lookup table with associations between the hardware subcomponents and memory locations. The lookup table can be updatable as the application data flow graph is executed or can comprise permanent associations for a given system. Module 464 could then identify when data has been written to an address in memory and use the lookup table to generate an event for the programmable stream controller associated with such address in memory. In embodiments in which the programmable stream controllers 455 can be reconfigured to administrate various streams this lookup table may be updated to reflect the current assignment of streams to specific programmable stream controllers. Module 464 can be a hardware module within the NOU such as a combination of logic gates able to implement the described functionality.

A module 462 can be configured to receive outgoing transfer events from the programmable stream controllers 455, or state machines implanted using other means, and translate them into network commands (e.g., NoC commands). Module 462 can issue network commands for outgoing data and control update transfers. Module 462 can be a component of the interface between the network layer and the network overlay layer, by translating outgoing events as issued by the network overlay layer into commands for the network layer. This module can be a hardware module within the NOU such as a combination of logic gates able to implement the described functionality. The interface can include logic and memory that keep track of the status of specific transfers, the location of specific streams on the various nodes of the network, and/or the state of buffers in memory 460.

In specific embodiments of the invention, the programmable stream controllers 455 can read the stream configuration information from memory 460 and update themselves based on that information. In this way, the state of the programmable stream controllers can be reconfigured for new streams or transitions of data as they are received or read from memory. For example, a stream controller 455 could read from an address in memory 460 to place itself in a condition where it was holding to conduct a memory copy operation from one location in memory 460 to another location in the system. The stream controller 455 could be waiting for a specific event to conduct this action or the system could be designed in such a way that dependencies where implicitly enforced and any event received by the stream controller 455 would cause it to execute that action. The stream controller 455 could then be designed to read from another address in memory 460 to place itself in a new condition after conducting that action. In this way, the stream controller 455 could follow a schedule to implement different portions of an application data flow graph at different times. At the same time, data can be read from memory 460 by a controller 420 or any entity of the computation layer in order to execute the computation in the computational node. The controller 420 can also set the state of the state machines as previously disclosed.

Dashed arrows in FIG. 5 represent the flow of incoming/outgoing transfers. Data, as received by router 430 and forwarded to the NIU 440, can be stored in memory 460 and the status of the data can be communicated to the NOU 450. Module 464 or data flow observation element 470 can translate the data from the NIU into events for the NOU. In specific embodiments, data flow observation element 470 will pass all data received from NIU 440 on to module 464 and the module will be tasked with all of the translation capabilities required for NOU 450 to be made aware of the availability and location of data delivered from alternative components of the network. The events from module 464 can then be sent to the corresponding programmable stream controller 455, which can respond to the delivered event and provide, through interface 412, outgoing events based on the delivered event and current state of the controller. The events from the stream administration units can then be translated into commands for the NIU 440 by module 462. The NIU 440 can receive the commands from the NOU 450, access data from memory 460, and proceed with the outgoing transfers. This interconnection allows the exchange of events between the network layer and the network overlay layer, and more specifically, between the programmable stream controllers and the NIU.

Solid arrows represent the internal flow for operation of the stream administration units and implemented state machines. Data such as the streams configuration can be read from memory 460 and provided to stream administration units through interface 414. The stream administration units can exchange events and data through crossbar 472. Controller 420 can also read data from memory 460 for the computation layer or to control the configuration of the stream administration units. This interconnection allows the exchange of events within the NoC overlay layer, and more specifically, between the state machines themselves.

Double lined arrows represent the interconnection of the programmable stream controllers and the endpoints. This interconnection allows for the exchange of events between the network overlay layer and the computation layer, and more specifically, between programmable stream controllers and the endpoints.

Although the example of FIG. 5 includes an NOU as the dedicated hardware component, the concepts, layers and component interconnections explained with reference to FIG. 5 can also be applicable to other embodiments of the invention that do not include an NOU or programmable stream controllers.

Figure 6:
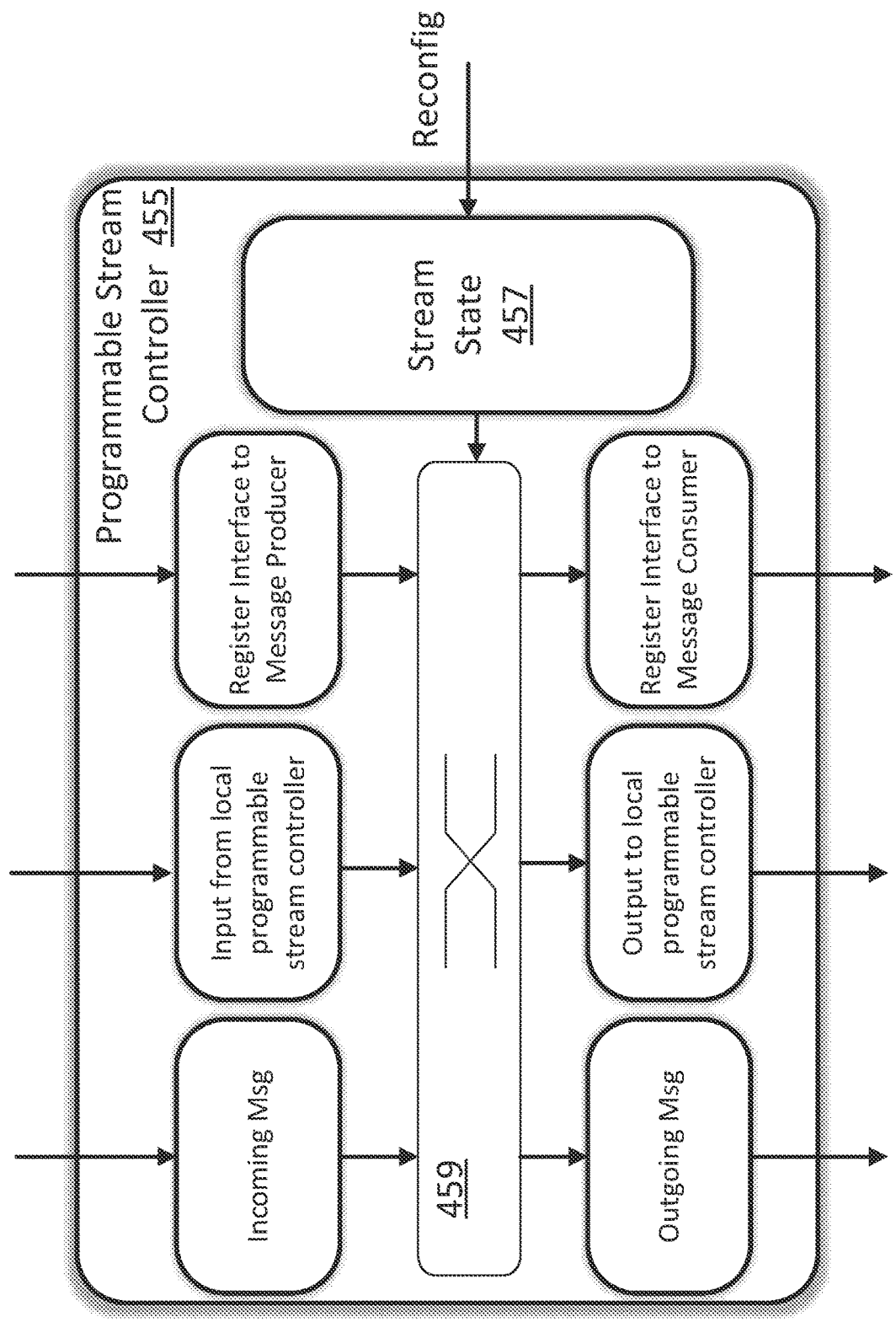
FIG. 6 includes a block diagram of a programmable stream controller in accordance with specific embodiments of the present invention disclosed herein.

FIG. 6 illustrates a block diagram of a programmable stream controller 455 in accordance with specific embodiments of the present invention. The programmable stream controller 455 can include a stream state register 457 that identifies the configuration of the streams, for example, by receiving such configuration from an address in memory. Automatic reconfiguration of the programmable stream controller 455 can occur through the stream state register 457, which can be achieved by the programmable stream controller 455 directly reading the stream state or configuration from memory as disclosed with reference to FIGS. 4 and 5. The stream state register 457 can be used to set the state of the programmable stream controller based on the stream configuration. Once the programmable stream controller is configured, it can be able to produce outputs that depend on the inputs and the current state. For example, crossbar 459 can be used to route events and produce the output of the programmable stream controller. Logic on either side of the crossbar can also be set by the stream state register to arbitrate among different inputs. In this way, incoming messages, such as inputs from local programmable stream controllers, can be entered as inputs for the stream administration unit 455, which will produce outgoing messages, such as outputs for programmable stream controller, based on the inputs and the current status of the programmable stream controller. The programmable stream controller 455 can also include interfaces such as a register interface to a message producer and register interface to a message consumer that can be used for interfacing with the computation layer or the endpoints. Producers and consumers can be, for example, the endpoints of the computational nodes, that ultimately use (consume) or generate (produce) data during computation.

Figure 7:
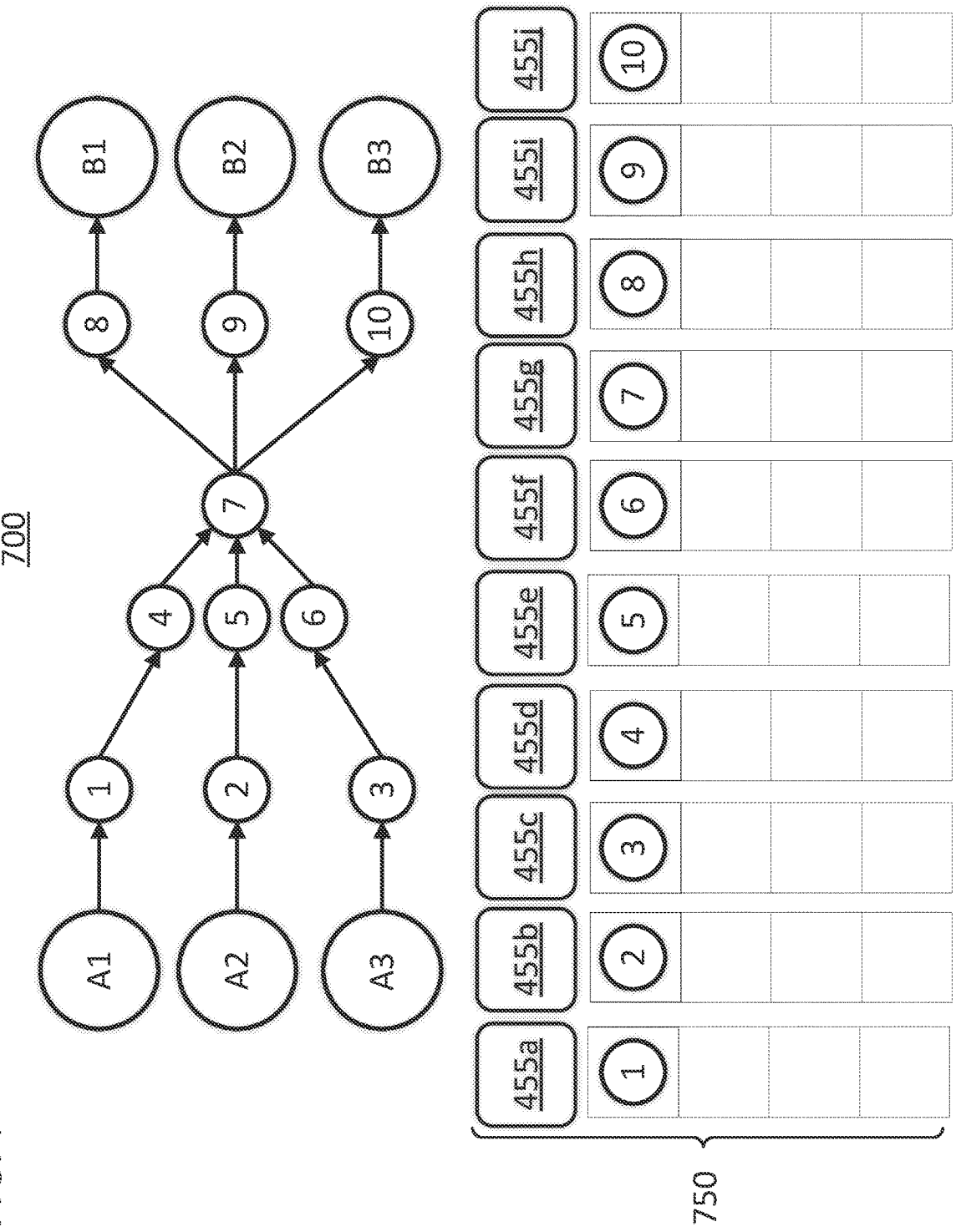
FIG. 7 includes an example of programmable stream controllers implementing different streams to execute an application data flow graph in a streaming mode in accordance with specific embodiments of the invention disclosed herein.

FIG. 7 includes an example of programmable stream controllers 455 configured to execute an application data flow graph 700 which consists of numbered nodes and a set of edges linking those nodes. FIG. 7 illustrates a first set of compute units A1, A2, and A3, and a second set of compute units B1, B2, and B3. The compute units can be entities of the computation layer, or endpoints in a computational node, such as producers and consumers of data. The application data flow graph 700 can describe how data needs to be distributed through the network of computational nodes in order to facilitate whatever component computation the network of computational nodes is executing. The numbered nodes can be the transfers of data or "streams" mentioned above and can each be administrated by a programmable stream controller. Each programmable stream controller 455 may be configured to support a single stream at a given time but may be reconfigured according to a compiled schedule through the course of the execution of an application data flow graph. The schedule is illustrated by diagram 750 which shows the schedule in descending order on the page of when the programmable stream controllers should be configured to implement which stream from the application data flow graph.

The system illustrated by FIG. 7 includes ten different programmable stream controllers which are each separately implemented in hardware. Although this can be resource intensive from a hardware perspective, such an approach is associated with certain benefits. For example, the programmable stream controllers 455 only need to be configured a single time to implement a given transfer of data which simplifies the job of the compiler tasked with setting the schedule of configurations for the programmable stream controllers. Furthermore, as seen, every portion of the application data flow graph is supported simultaneously by the programmable stream controllers. The programmable stream controllers can therefore all be operating in a streaming mode and administrate the passage of packets through the network layer as soon as they are available. The illustrated approach is therefore efficient from a latency and bandwidth perspective.

As can be seen from FIG. 7, compute units A produce data to be injected in the graph and compute units B consume data from the graph, however, the compute units are not involved in the execution of the data flow graph itself. As explained before in this disclosure, the execution of the application data flow graph can be carried out by the network overlay layer and be isolated from the computation layer. In this way, compute units are not necessarily involved in the intermediate transitions of data through the network after they produce the data to be sent and/or before the receive the data to be consumed.

Figure 8:
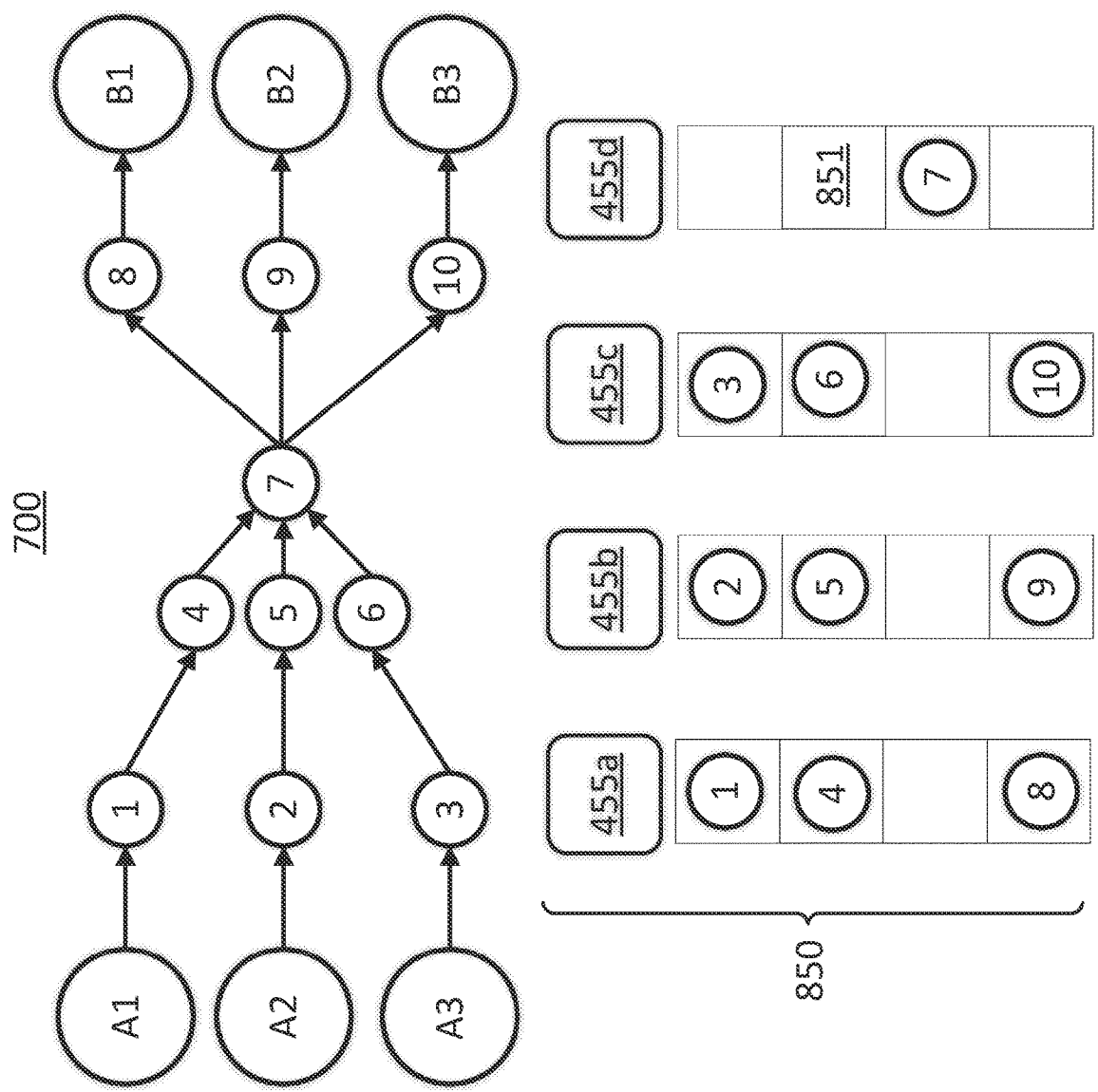
FIG. 8 includes an example of programmable stream controllers implementing different streams at different time slots in order to execute an application data flow graph in a memory copy mode in accordance with specific embodiments of the invention disclosed herein.

FIG. 8 illustrates an example in accordance with specific embodiments of the invention with programmable stream controllers 455 configured to implement different streams at different times in order to execute application data flow graph 700. The system illustrated by FIG. 8 includes only four programmable stream controllers 455. As such, and as illustrated by diagram 850, the stream controllers 455 implement different streams at different times by being configured and reconfigured to execute such streams. Furthermore, since stream 4 is necessarily not yet instantiated when stream 1 is executed, the underlying data transfer that is administrated by stream unit 455*a* when executing stream 1 is a memory copy operation instead of a network packet streaming operation. In this case, the stream could copy data from a pipeline associated with compute unit A1 into a memory buffer associated with stream unit 455*a*. Also illustrated by FIG. 8 is the fact that programmable stream controller 455*d* needs to receive events indicating that the data from streams 4, 5, and 6 is available in order to configure itself for the execution of stream 7. This can be conducted via the delivery of tokens from stream administration units 455*a*, 455*b*, and 455*c* at time step 851 on the schedule of stream administration unit 455*d*.

Figure 9:
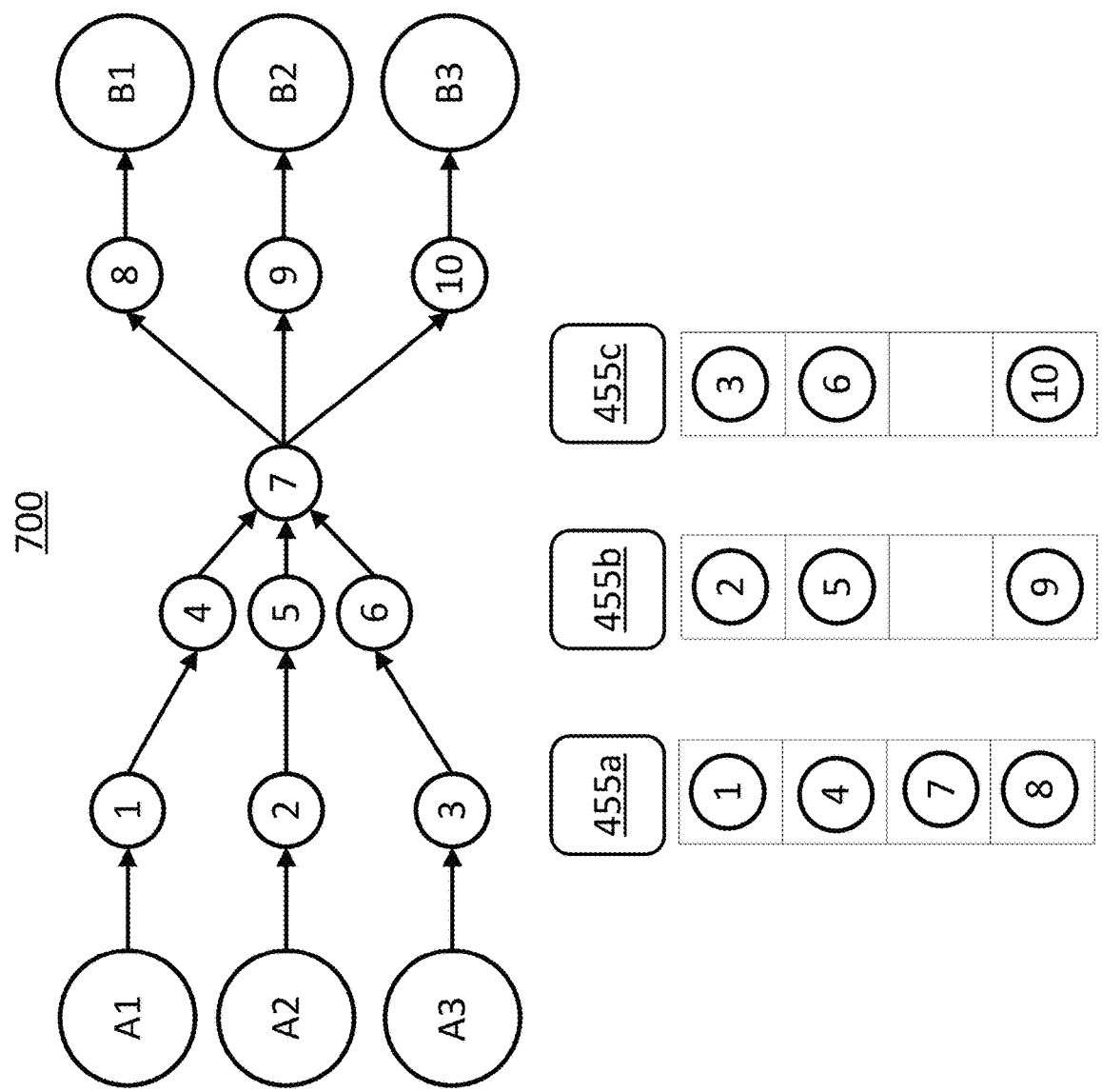
FIG. 9 includes an example of programmable stream controllers implementing different streams at different time slots in order to execute an application data flow graph in a memory copy mode and using implicitly enforced dependencies in accordance with specific embodiments of the invention disclosed herein.

FIG. 9 illustrates an example in accordance with specific embodiments of the invention with programmable stream controllers 455 configured to implement different streams at different times in order to execute application data flow graph using implicitly enforced dependencies. As illustrated, programmable stream controller 455*a* is scheduled to be reconfigured to execute stream 4 after executing stream 1. In application data flow graph 700 stream 4 must be executed by stream 1. However, there is no need to assure that the data from stream 1 is available before executing stream 4 because this assurance has been compiled into the schedule. Furthermore, stream controller 455a does not need to be informed that data from streams 5 and 6 is available prior to being instantiated because programmable stream controller 455a can be placed in a state when executing stream 7 that monitors for events from stream controllers 455b and 455c which state that the data from those streams is available, stream 7 can then execute without any potential for conflict despite the fact that each programmable stream controller is asynchronously executing the streams with which it has been scheduled.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although the example of a NOU as a dedicated hardware component, and programmable controllers as hardware subcomponents of the dedicated hardware components was used throughout the disclosure, dedicated hardware components and subcomponents are not limited to those examples, and can include any logic, state machine, or programmable controller than is able to implement the functions described in this disclosure. Furthermore, the teachings disclosed herein should not be limited to a NoC connecting a network of processing cores as they can be applied to any network which operates to connect any set of computation units which are executing a complex computation. Furthermore, the disclosure should not be limited to any specific type of complex computation being executed on a multicore processor as the programming of and execution of any complex computation can be aided by specific embodiments disclosed herein including training or drawing an inference from an artificial neural network, or executing a hashing, encryption, decryption, or graphics rendering algorithm involving a large number of component computations. Furthermore, the examples of a network overlay layer isolating a computation layer from a network layer should not be interpreted to exclude systems which can be placed in a debugging mode, or similar mode of operation, in which the continuous execution of a complex computation is stalled and the hardware or software otherwise associated with the computation layer can have a direct impact on the network layer without communicating with the network overlay layer. These and other modifications and variations to the present invention may be practiced by those skilled in the art, without departing from the scope of the present invention, which is more particularly set forth in the appended claims.

What is claimed is:

1. A system for executing a complex computation on a set of processing cores, the system comprising:
   a set of processing pipelines, wherein each processing core in the set of processing cores includes at least one processing pipeline from the set of processing pipelines;
   a set of static random-access memories, wherein each processing core in the set of processing cores includes at least one static random-access memory from the set of static random-access memories;
   a set of core controllers to administrate transfers of data from the set of static random-access memories to the set of processing pipelines to execute a set of component computations required for the complex computation, wherein each processing core in the set of processing cores includes at least one core controller from the set of core controllers; and
   a set of programmable controllers, wherein the programmable controllers in the set of programmable controllers are programmable stream controllers and are configurable using instructions, wherein the set of programmable controllers execute the instructions to execute an application data flow graph required for the complex computation, and wherein each processing core in the set of processing cores includes at least one programmable controller from the set of programmable controllers;
   wherein the application data flow graph requires data for the complex computation to flow between the processing cores in the set of processing cores and the data for the complex computation is streamed between the processing cores in the set of processing cores.

2. The system of claim 1, wherein:
   the set of programmable controllers execute the instructions independently of the set of core controllers.

3. The system of claim 1, further comprising:
   a set of routers, wherein each processing core in the set of processing cores includes at least one router from the set of routers;
   wherein the set of programmable controllers execute the instructions in response to the set of routers exchanging the data for the complex computation.

4. The system of claim 3, further comprising:
   a set of dedicated hardware components for executing the application data flow graph, wherein the programmable controllers in the set of programmable controllers are components of the set of dedicated hardware components;
   wherein the set of programmable controllers execute the instructions in response to the set of dedicated hardware components receiving events that indicate the set of routers have exchanged the data for the complex computation.

5. The system of claim 4, further comprising:
   a set of network interface modules, wherein each processing cores in the set of processing cores includes at least one network interface module from the set of network interface modules; and
   a set of translator modules, wherein the translator modules are configured to translate inbound data transfers from the set of network interface modules to the events for the set of dedicated hardware components.

6. The system of claim 1, wherein:
   the core controllers in the set of core controllers are servants of the programmable controllers in the set of programmable controllers after the set of programmable controllers have been programmed with the instructions.

7. The system of claim 1, wherein:
   the programmable controllers in the set of programmable controllers are configured to control at least one of: (i) a stalled status; and (ii) a program counter of the core controllers in the set of core controllers.

8. The system of claim 1, wherein:
   the set of core controllers are part of a computation layer of the set of processing cores; and
   the set of programmable controllers execute the instructions to administrate a streaming transfer of the data for the complex computation through a network layer of the set of processing cores.

9. The system of claim 8, further comprising:
a set of network overlay units, wherein each processing core in the set of processing cores includes at least one network overlay unit from the set of network overlay units; and
the set of programmable controllers are part of the set of network overlay units;
wherein: (i) the set of network overlay units are part of a network overlay layer of the set of processing cores; and (ii) the network overlay layer logically isolates the computation layer from the network layer.

10. The system of claim 9, wherein:
the programmable controllers in the set of programmable controllers have a customized instructions set for implementing the network overlay layer.

11. The system of claim 1, wherein:
the programmable controllers in the set of programmable controllers are configured to be reconfigured with additional instructions during the execution of the application data flow graph to administrate additional transfers of data.

12. The system of claim 1, wherein:
both the set of core controllers and the set of programmable controllers administrate transfers of data from the set of static random-access memories.

13. The system of claim 1, further comprising:
a network for routing the data between the processing cores, wherein the network is a toroidal mesh;
wherein the programmable controllers are configured to administrate single-hop and multi-hop transmissions through the network.

14. A method for executing a complex computation on a set of processing cores, wherein the set of processing cores includes a set of processing pipelines, a set of static random-access memories, a set of core controllers, and a set of programmable controllers, wherein the set of programmable controllers are programmable stream controllers, and wherein the method comprises:
administrating, using the set of core controllers, transfers of data from the set of static random-access memories to the set of processing pipelines to execute a set of component computations required for the complex computation;
configuring the set of programmable controllers using instructions;
streaming the data for the complex computation between the processing cores in the set of processing cores; and
executing the instructions to execute an application data flow graph required for the complex computation;
wherein the application data flow graph requires data for the complex computation to flow between the processing cores in the set of processing cores.

15. The method of claim 14, wherein:
the set of programmable controllers execute the instructions independently of the set of core controllers.

16. The method of claim 14, further comprising:
exchanging the data for the complex computation between a set of routers, wherein each processing core in the set of processing cores includes at least one router from the set of routers;
wherein the set of programmable controllers execute the instructions in response to the set of routers exchanging the data for the complex computation.

17. The method of claim 16, further comprising:
receiving, using a set of dedicated hardware components, events that indicate the set of routers have exchanged the data for the complex computation, wherein the programmable controllers in the set of programmable controllers are components of the set of dedicated hardware components;
wherein the set of programmable controllers execute the instructions in response to the set of dedicated hardware components receiving the events.

18. The method of claim 17, further comprising:
translating inbound data transfers from a set of network interface modules to the events for the set of dedicated hardware components, wherein each processing cores in the set of processing cores includes at least one network interface module from the set of network interface modules.

19. The method of claim 14, wherein:
the core controllers in the set of core controllers are servants of the programmable controllers in the set of programmable controllers after the set of programmable controllers have been programmed with the instructions.

20. The method of claim 14, further comprising:
controlling, using the set of programmable controllers, at least one of: (i) a stalled status; and (ii) a program counter of the core controllers in the set of core controllers.

21. The method of claim 14, wherein:
the core controllers in the set of core controllers are part of a computation layer of the set of processing cores; and
the programmable controllers in the set of programmable controllers execute the instructions to administrate a streaming transfer of the data for the complex computation through a network layer of the set of processing cores.

22. The method of claim 21, further comprising:
logically isolating the computation layer from the network layer using a network overlay layer;
wherein: (i) each processing core in the set of processing cores includes at least one network overlay unit from a set of network overlay units; (ii) the programmable controllers in the set of programmable controllers are part of the network overlay units in the set of network overlay units; and (iii) the set of network overlay units are part of the network overlay layer.

23. The method of claim 22, wherein:
the programmable controllers in the set of programmable controllers have a customized instructions set for implementing the network overlay layer.

24. The method of claim 14, further comprising:
reconfiguring the programmable controllers in the set of programmable controllers with additional instructions during the execution of the application data flow graph to administrate additional transfers of data.

25. The method of claim 14, further comprising:
administrating transfers of the data from the set of static random-access memories using the set of core controllers; and
administrating transfers of the data from the set of static random-access memories using the set of programmable controllers.

26. The method of claim 14, further comprising:
administrating, using the programmable controllers, single-hop and multi-hop transmissions through a network for routing the data between the processing cores;
wherein the network is a toroidal mesh.

27. A system for executing a complex computation on a set of processing cores, the system comprising:

a set of processing pipelines, wherein each processing core in the set of processing cores includes at least one processing pipeline from the set of processing pipelines;
a set of static random-access memories, wherein each processing core in the set of processing cores includes at least one static random-access memory from the set of static random-access memories;
a set of core controllers to administrate transfers of data from the set of static random-access memories to the set of processing pipelines to execute a set of component computations required for the complex computation, wherein each processing core in the set of processing cores includes at least one core controller from the set of core controllers;
a set of programmable controllers, wherein the programmable controllers in the set of programmable controllers are configurable using instructions, wherein the set of programmable controllers execute the instructions to execute an application data flow graph required for the complex computation, each processing core in the set of processing cores includes at least one programmable controller from the set of programmable controllers, and the application data flow graph requires data for the complex computation to flow between the processing cores in the set of processing cores;
a set of routers, wherein each processing core in the set of processing cores includes at least one router from the set of routers, and the set of programmable controllers execute the instructions in response to the set of routers exchanging the data for the complex computation;
a set of dedicated hardware components for executing the application data flow graph, wherein the programmable controllers in the set of programmable controllers are components of the set of dedicated hardware components, and wherein the set of programmable controllers execute the instructions in response to the set of dedicated hardware components receiving events that indicate the set of routers have exchanged the data for the complex computation;
a set of network interface modules, wherein each processing cores in the set of processing cores includes at least one network interface module from the set of network interface modules; and
a set of translator modules, wherein the translator modules are configured to translate inbound data transfers from the set of network interface modules to the events for the set of dedicated hardware components.

28. A system for executing a complex computation on a set of processing cores, the system comprising:
a set of processing pipelines, wherein each processing core in the set of processing cores includes at least one processing pipeline from the set of processing pipelines;
a set of static random-access memories, wherein each processing core in the set of processing cores includes at least one static random-access memory from the set of static random-access memories;
a set of core controllers to administrate transfers of data from the set of static random-access memories to the set of processing pipelines to execute a set of component computations required for the complex computation, wherein each processing core in the set of processing cores includes at least one core controller from the set of core controllers and the set of core controllers are part of a computation layer of the set of processing cores; and
a set of programmable controllers, wherein the programmable controllers in the set of programmable controllers are configurable using instructions, wherein the set of programmable controllers execute the instructions to administrate a streaming transfer of the data for the complex computation through a network layer of the set of processing cores and execute the instructions to execute an application data flow graph required for the complex computation, and wherein each processing core in the set of processing cores includes at least one programmable controller from the set of programmable controllers;
wherein the application data flow graph requires data for the complex computation to flow between the processing cores in the set of processing cores.

29. The system of claim 28, further comprising:
a set of network overlay units, wherein each processing core in the set of processing cores includes at least one network overlay unit from the set of network overlay units; and
the set of programmable controllers are part of the set of network overlay units;
wherein: (i) the set of network overlay units are part of a network overlay layer of the set of processing cores; and (ii) the network overlay layer logically isolates the computation layer from the network layer.

30. The system of claim 29, wherein:
the programmable controllers in the set of programmable controllers have a customized instructions set for implementing the network overlay layer.

31. A method for executing a complex computation on a set of processing cores, wherein the set of processing cores includes a set of processing pipelines, a set of static random-access memories, a set of core controllers, and a set of programmable controllers, and wherein the method comprises:
administrating, using the set of core controllers, transfers of data from the set of static random-access memories to the set of processing pipelines to execute a set of component computations required for the complex computation;
configuring the set of programmable controllers using instructions;
exchanging the data for the complex computation between a set of routers, wherein each processing core in the set of processing cores includes at least one router from the set of routers, and wherein the set of programmable controllers execute the instructions in response to the set of routers exchanging the data for the complex computation;
receiving, using a set of dedicated hardware components, events that indicate the set of routers have exchanged the data for the complex computation, wherein the programmable controllers in the set of programmable controllers are components of the set of dedicated hardware components, wherein the set of programmable controllers execute the instructions in response to the set of dedicated hardware components receiving the events;
translating inbound data transfers from a set of network interface modules to the events for the set of dedicated hardware components, wherein each processing core in the set of processing cores includes at least one network interface module from the set of network interface modules; and
executing the instructions to execute an application data flow graph required for the complex computation, wherein the application data flow graph requires data for the complex computation to flow between the processing cores in the set of processing cores.

32. A method for executing a complex computation on a set of processing cores, wherein the set of processing cores includes a set of processing pipelines, a set of static random-access memories, a set of core controllers, and a set of programmable controllers, wherein the core controllers in the set of core controllers are part of a computation layer of the set of processing cores, and wherein the method comprises:

administrating, using the set of core controllers, transfers of data from the set of static random-access memories to the set of processing pipelines to execute a set of component computations required for the complex computation;

configuring the set of programmable controllers using instructions; and executing the instructions to execute an application data flow graph required for the complex computation, wherein the programmable controllers in the set of programmable controllers execute the instructions to administrate a streaming transfer of the data for the complex computation through a network layer of the set of processing cores;

wherein the application data flow graph requires data for the complex computation to flow between the processing cores in the set of processing cores.

33. The method of claim 32, further comprising:

logically isolating the computation layer from the network layer using a network overlay layer;

wherein: (i) each processing core in the set of processing cores includes at least one network overlay unit from a set of network overlay units; (ii) the programmable controllers in the set of programmable controllers are part of the network overlay units in the set of network overlay units; and (iii) the set of network overlay units are part of the network overlay layer.

34. The method of claim 33, wherein:

the programmable controllers in the set of programmable controllers have a customized instructions set for implementing the network overlay layer.

* * * * *